(12) United States Patent
Kreyenhagen

(10) Patent No.: US 11,089,735 B2
(45) Date of Patent: Aug. 17, 2021

(54) BALER

(71) Applicant: Maschinenfabrik Bernard Krone GmbH & Co. KG, Spelle (DE)

(72) Inventor: Michael Kreyenhagen, Bohmte (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 138 days.

(21) Appl. No.: 15/957,943

(22) Filed: Apr. 20, 2018

(65) Prior Publication Data

US 2019/0000017 A1  Jan. 3, 2019

(30) Foreign Application Priority Data

Apr. 21, 2017 (DE) ..................... 10 2017 003 881.3

(51) Int. Cl.
  *A01F 15/08* (2006.01)
  *A01F 15/14* (2006.01)
  *A01F 15/12* (2006.01)

(52) U.S. Cl.
  CPC ........ *A01F 15/0858* (2013.01); *A01F 15/085* (2013.01); *A01F 15/141* (2013.01); *A01F 15/12* (2013.01); *A01F 15/14* (2013.01); *A01F 2015/143* (2013.01)

(58) Field of Classification Search
  CPC .. A01F 15/0585; A01F 15/085; A01F 15/141; A01F 15/14; A01F 15/12; A01F 15/145; A01F 15/042; A01F 2015/143; A01F 2015/0866; A01F 15/0858; B65H 69/04; B65H 69/043; B65B 13/184;
  (Continued)

(56) References Cited

U.S. PATENT DOCUMENTS 2,690,114 A    9/1954  Tice
6,644,181 B2 * 11/2003 Honhold ............. A01F 15/0858
                                                    100/19 R
(Continued)

FOREIGN PATENT DOCUMENTS

DE         925 554       7/1954
DE         925554 C  *  3/1955  ............. A01F 15/14
(Continued)

*Primary Examiner* — Shelley M Self
*Assistant Examiner* — Teresa A Guthrie
(74) *Attorney, Agent, or Firm* — Gudrun E. Huckett

(57) ABSTRACT

A baler for agricultural crop has a pressing channel and a needle rocker pivotably arranged at the pressing channel about a rocker pivot axis arranged in a plane that is orthogonal to the longitudinal center axis of the pressing channel. A drive arrangement connected to the needle rocker pivots the needle rocker relative to the pressing channel. The needle rocker has tying needles that are moved through the pressing channel when the needle rocker is pivoted. The drive arrangement has a drive element, rotatably supported about a drive axis of rotation; a coupling device pivotably supported about a coupling pivot axis positioned stationarily relative to the pressing channel; and a drive lever with a first end eccentrically connected to the drive element and a second end connected to the coupling device. The coupling device is connected to the needle rocker spaced from the rocker pivot axis of the needle rocker.

14 Claims, 26 Drawing Sheets

(58) Field of Classification Search
CPC ........... B65B 13/22; B30B 1/06; B30B 1/261; B30B 1/266; B30B 1/268
USPC ...................... 100/4, 17, 19 R, 33 R, 23, 24
See application file for complete search history.

(56) References Cited

U.S. PATENT DOCUMENTS

| | | | |
|---|---|---|---|
| 7,526,995 B2 * | 5/2009 | Actis ...................... | A01D 59/00 100/2 |
| 9,107,347 B2 * | 8/2015 | Esau .................... | A01F 15/0858 |
| 2009/0165960 A1 * | 7/2009 | Hataya .................... | B65B 13/18 156/382 |
| 2016/0021826 A1 | 1/2016 | Keller et al. | |

FOREIGN PATENT DOCUMENTS

| | | | | |
|---|---|---|---|---|
| DE | 103 29 136 | | 2/2005 | |
| EP | 2 057 879 | | 5/2009 | |
| GB | 837 518 | | 6/1960 | |
| GB | 837518 A | * | 6/1960 | ............. B65B 27/12 |

* cited by examiner

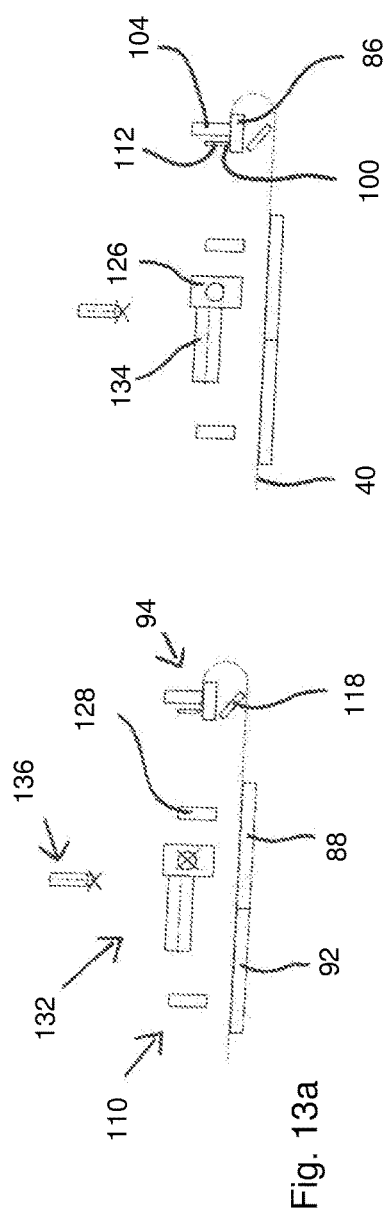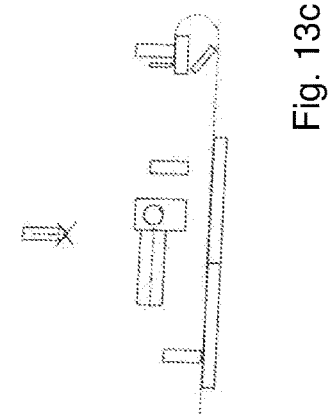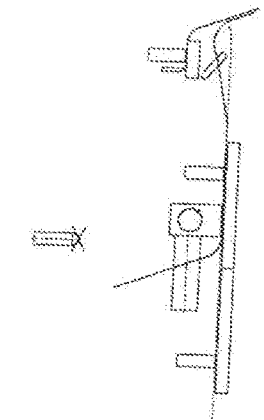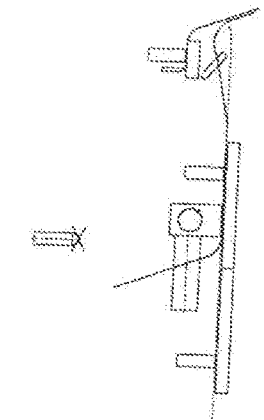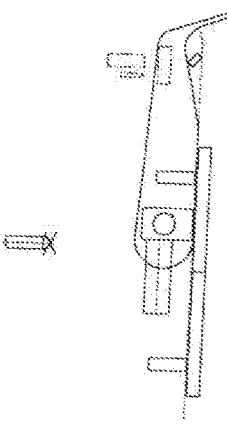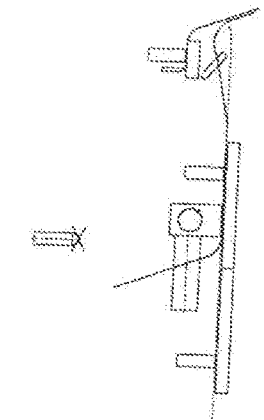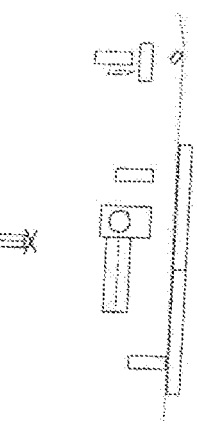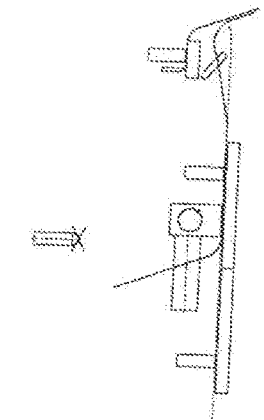
Fig. 13a Fig. 13b Fig. 13c Fig. 13d Fig. 13e Fig. 13f Fig. 13g Fig. 13h Fig. 13i

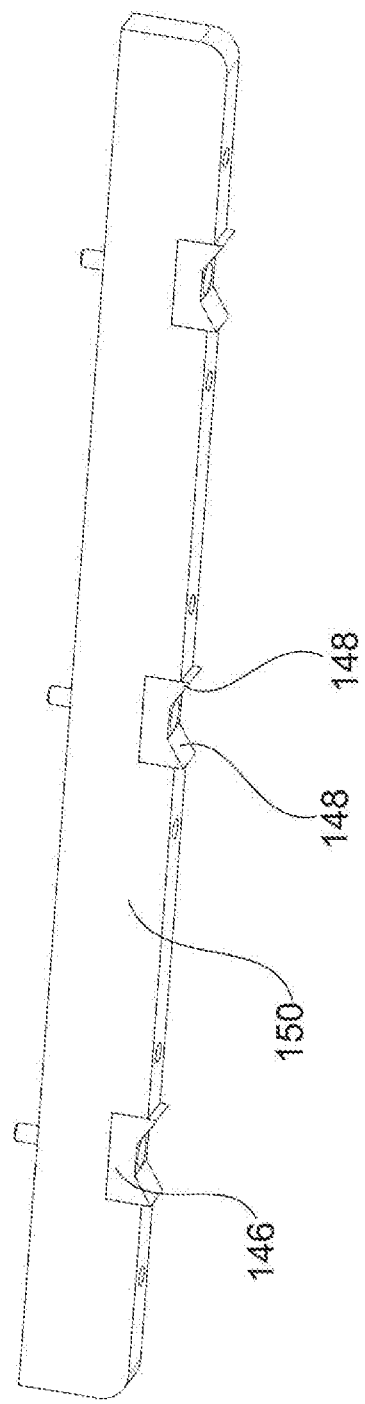

BALER

BACKGROUND OF THE INVENTION

The invention concerns a baler for agricultural crop with a pressing channel and with a needle rocker, which is pivotably supported about a rocker pivot axis, arranged in a rocker pivot axis plane that is orthogonal to a longitudinal center plane of a pressing channel, and which is driven by at least one drive arrangement, which comprises at least one tying needle that is movable by pivoting of the needle rocker through the pressing channel, wherein the drive arrangement comprises a drive element, rotatably supported about a drive axis of rotation, and a drive lever which is eccentrically arranged thereat.

Such balers are known from the prior art. They are used frequently as mobile balers in agriculture in order to compress, for example, straw or hay to bales. Such balers can however also be used as stationarily operated balers. In agriculture, there is a need for high-performance, in particular high-compression balers with high throughput and high reliability and availability.

Object of the present invention is to improve a baler of the aforementioned kind in regard to its efficiency in a way as simple as possible.

SUMMARY OF THE INVENTION

According to the invention, the object is solved in that the drive arrangement comprises a coupling device which is pivotably arranged about a coupling pivot axis which is positioned stationarily relative to the pressing channel. The coupling device is arranged at the needle rocker at a distance to the rocker pivot axis of the needle rocker, and the drive lever is arranged at the coupling device.

By providing a coupling device in the drive arrangement of the needle rocker, the kinematics of the needle rocker can be changed relative to presently known balers. In particular, the coupling device enables the tying needles arranged at the needle rocker to be guided faster from an initial position through the pressing channel in comparison to a conventional drive arrangement and to thus supply a tying material looped around a bale more quickly to a device which joins the tying material. By use of a drive arrangement with a coupling device, the time period during which the tying needle remains in the region of a device for joining the tying material, in comparison to the time period that is required for passing the tying needle through the pressing channel, can be extended. Accordingly, the duration of a tying cycle as a whole can be shortened without significant changes having to be carried out at further driven parts of the tying device. The tying cycle is the process by means of which two regions of the tying material looped around a finish-pressed bale are joined.

In an advantageous embodiment, the baler comprises a drive arrangement on one side of the pressing channel. In this way, only one coupling device as a part of the drive arrangement as well as only one drive arrangement are required. The constructive expenditure for the drive arrangement of the needle rocker is thus minimized.

In an alternative advantageous embodiment, the baler comprises a drive arrangement at two oppositely positioned sides of the pressing channel, respectively. In this way, a force is introduced at both sides of the needle rocker into it. By means of the two-sided introduction of the force, torsion forces on the needle rocker as well as on the drive arrangement are reduced. This increases the service life of the baler, in particular when high forces are acting on the needle rocker and the drive arrangements in case of very fast movements of the needle rocker.

Preferably, the coupling device comprises a first coupling lever and at least one further coupling lever, wherein the first coupling lever is movably connected to the further coupling lever. By using two coupling levers that are movably coupled to each other a mechanically simple embodiment of the coupling device is realized which can effect the desired change in the kinematics of the needle rocker. Particularly preferred, the first coupling lever is pivotably arranged about the coupling pivot axis and the drive lever is arranged at the first coupling lever. By arrangement of the drive lever at the first coupling lever that is stationarily secured by the coupling pivot axis relative to the pressing channel, these elements of the drive arrangement are fixed relative to each other in a defined way. In this way, the risk of malfunctions of the drive arrangement is reduced and the reliability of the baler is increased.

Preferably, the rocker pivot axis, the drive axis of rotation, and the coupling pivot axis are arranged parallel to each other. This enables a simple configuration of the drive arrangement because the movement components of the needle rocker, of the drive element, and of at least a part of the coupling device are arranged in planes that are parallel to each other or in the same plane. This enables the use of connecting elements with a degree of freedom. Particularly preferred, the pivot axes of all joints that are included in the coupling device are positioned parallel to the rocker pivot axis. In this case, all movement components of the drive device are arranged in planes that are parallel to each other or in identical planes. This further simplifies the construction of a corresponding drive arrangement because connecting elements with a degree of freedom can now be used exclusively. Also, the reliability and service life of the baler are increased.

Advantageously, in an initial position in which the needle rocker is positioned prior to and after a needle rocker cycle completing a bale tying action, a drive lever axis of rotation, that is parallel to the drive axis of rotation and about which the drive lever is rotatably arranged at the drive element, is moved out of a coupling plane in which the drive axis of rotation and a drive coupling pivot axis, about which the drive lever is pivotably arranged at the coupling device, are lying. The direct connection between the drive axis of rotation and a drive coupling pivot axis is arranged in the coupling plane in the initial position. In this context, the drive coupling pivot axis is the axis about which the drive lever is pivotably connected with the coupling device. The drive lever axis of rotation about which the drive lever is rotatably arranged at the drive element is not positioned within the coupling plane in an initial position. By selecting the position of the drive lever axis of rotation relative to the coupling plane, the kinematics of the needle rocker during the needle rocker cycle can be influenced. In this way, it is possible to adjust the needle rocker cycle to the desired behavior. Particularly advantageously, the drive axis of rotation and the drive lever axis of rotation are positioned in a drive plane that is positioned in an initial position at a slant of 30° to 90° relative to the coupling plane. Based on the modification of known needle rocker drives of balers, a positioning of the drive lever axis of rotation in a region that is slanted by 30° to 90° relative to the coupling plane has been found to be advantageous. In this way, the needle rocker experiences a higher initial acceleration upon movement from the initial position which shortens the time that tying needles require for passing through the pressing channel in comparison to the time spent by the tying needle about top dead center.

Preferably, the region of the coupling device which is stationarily arranged relative to the pressing channel and the region of the coupling device which is arranged at the needle rocker have a substantially maximum possible distance from each other in the initial position. In this way, it is possible to use only a part of one revolution of the drive element for the movement of the tying needle from the initial position through the pressing channel to top dead center and again out of the pressing channel. The remaining part of the revolution of the drive element effects a deflection of the coupling device in a direction which is opposite to the first deflection until the coupling device has reached again a stretched position and the needle rocker thus again its initial position. In this context, the tying needle is immersed again at least partially into the pressing channel. The immersion, i.e., the deflection of the coupling device in a direction which is opposite to the first deflection as well as the immersion of the tying needle into the pressing channel, can be avoided by providing suitable blocking devices, for example, in the form of stop elements, in the coupling device. The completion of the revolution of the drive element must however still be ensured. This can be realized, for example, by attachment of elastic elements in or at the drive lever. They can be embodied by spring elements, for example.

Preferably, for a maximum pivoting action of the needle rocker, a pressing piston which is arranged in the pressing channel is positioned substantially in a stretched position. In the stretched position, the pressing piston is introduced maximally into the pressing channel and applies the maximum pressure onto the bale to be tied. When upon reaching the stretched position of the pressing piston the tying needle is at top dead center and transfers the tying material to the device that ties the tying material, the bale can be tied with maximum possible compression density and the density of the bale can be maximized. Accordingly, the efficiency of the baler is increased. In the present embodiment of the baler according to the invention, the tying needle passes through the pressing channel from an initial position to top dead center in less than 0.5 seconds. This provides a significant time savings relative to 0.6 to 0.7 seconds in known conventionally driven balers. In this way, the pressing piston frequency can be increased and the bale can be looped around by the tying material at a higher compression density.

Advantageously, the needle rocker comprises at least three tying needles that substantially extend in planes perpendicular to the rocker pivot axis, respectively. Accordingly, a bale to be tied is looped around by the tying material at least at three different locations. This increases the strength and stability of the tied bales and enables thus more tightly compressed bales and thus a higher efficiency of the baler.

Preferably, the drive element is arranged at a control shaft that controls a tying cycle with one revolution. In conventional balers, the elements required for tying the tying material are controlled by a central control shaft. In this context, usually a tying cycle is controlled by one revolution of the control shaft. By arranging the drive element at the control shaft, the movement of the needle rocker and thus of the tying needles is made dependent on the drive of the elements joining the tying material. In this way, the reliability and availability of the baler is improved.

In an advantageous embodiment, the baler comprises at least one tying device for a strip-shaped tying material of preferably a fusible or glueable plastic material for enveloping the bale to be pressed. Moreover, the tying device comprises a material fusion generator that joins the tying material by material fusion.

The use of a strip-shaped tying material of preferably a fusible or glueable plastic material that can be joined by a material fusion generator by material fusion has a significantly higher tensile strength in comparison to the tying material which has been used up to now in balers for agricultural crop, in particular tying twine that is to be connected by knotting. The maximum achievable tensile strength, that depends on the selection of the material of the strip-shaped tying material as well as the dimensions of the tying material, of a strip-shaped tying material joined by material fusion can amount to two times to three times that of the usual knotted material. In this way, the quantity of the tying material about a bale or the number of tying devices at a baler for identical bale dimensions relative to the prior art can be reduced and/or the pressures and thus the packing density and thus also the weights of the produced bales can be increased. The achievable packing density of bales in agricultural balers is limited in the currently known balers with knotters by the tensile strength of the knotted tying material. This limitation can be overcome by use of a strip-shaped tying material that is joined by a material fusion generator by material fusion.

Advantageously, the tying device comprises a decoiling device and a strip storage device that stores a part of the tying material guided between the decoiling device and the material fusion generator. The strip storage device comprises at least two strip storage axle bodies about which the tying material is looped and at least one of which is movably arranged as a free axle body. In this way, the distance of the strip storage axle bodies relative to each other can be changed. The strip storage device comprises furthermore at least one strip storage restoring device by means of which the free axle body can be loaded with a force moving the free axle body in a direction that enlarges the distance of the strip storage axle bodies.

The strip-shaped tying material that is stored coiled must be decoiled due to the rectangular cross section. This is a problem during the tying cycle. When passing the tying material by means of the tying needles through the pressing channel, longer sections of the tying material must be made available within a very short period of time, of 0.6 to 0.7 seconds down to less than 0.4 seconds, and moved through the pressing channel. Due to the high mass moment of inertia of the coiled tying material, the drive arrangement of the needle rocker would exhibit a short-term very high power uptake when the tying material would not tear or parts of the baler, such as the tying needle, would not be damaged as a result of the great load.

The use of a strip-shaped tying material is enabled in that at the baler a strip storage device is provided. The latter stores a part of the tying material in it and can dispense it very quickly with comparatively minimal forces when the tying needle guides the tying material through the pressing channel. Subsequently, the strip storage device again fills slowly between two tying cycles so that it is filled again prior to the next tying cycle when the tying material is guided by the tying needle through the pressing channel. The strip storage device enables thus a continuous decoiling of the tying material and avoids extreme power and load peaks.

In this respect, strip storage axle bodies of the strip storage device are changeable with regard to their distance to each other such that by its change at least tying material of a length corresponding to a distance difference between the strip storage axle bodies, preferably however a multiple of the distance difference of the strip storage axle bodies, can be released in a short period of time.

The restoring element loads the free axle body with a force by means of which the free axle body moves in a direction that causes the distance between the strip storage axle bodies to enlarge. The strip storage device removes in this context tying material from the decoiling device and fills again with tying material. This tying material is then available for the next tying cycle. At the same time, the strip storage device dispenses a portion of the tying material that is then placed in a pressing cycle of a new bale about a portion of its circumference.

Preferably, the strip storage axle bodies are oriented parallel to each other. The tying material can therefore be guided flat and without torsion in the strip storage device. The tying material is thus loaded only minimally. This enables a reliable and operationally safe tying action of a bale and thus the efficiency of the baler.

Preferably, the strip storage axle bodies each are alternately looped around multiple times by the tying material like a block and tackle arrangement. By the multiple loops around the strip storage axle bodies, the strip storage axle bodies can dispense, upon a change of the distance of the strip storage axle bodies relative to each other, a multiple of the distance difference of tying material. In this way, the size of the strip storage device in the baler can be reduced.

Preferably, the strip storage axle bodies are movable in a plane relative to each other. This enables the construction of a strip storage device as a lengthwise extending component which can be fitted harmonically into a baler which is substantially defined by the lengthwise extending pressing channel. This enables the construction of a compact and cost-efficient baler.

In an advantageous embodiment, one strip storage device is correlated with one tying device. The individual strip storage devices therefore have comparatively small dimensions and can be arranged in accordance with the available installation space optimally in the baler.

In an alternative advantageous embodiment, a strip storage device is correlated with several tying devices of the baler. In this way, the number of required strip storage devices is reduced and thereby the total required installation space as well as the total required weight of the strip storage device is reduced in comparison to a solution with individual strip storage devices for each tying device.

Advantageously, the tying material that is dispensable by a change of the distance of the strip storage axle bodies comprises a length between 1 m and 4 m. The maximal dispensable length of the tying material and thus of the dimensions of the strip storage device can therefore be adjusted to the height of the pressing channel or the height of the bale to be pressed. The strip storage device should be able to release at least tying material of twice the bale height plus an overlap length required for the material fusion generator. A maximum dispensable tying material length between 1 m and 4 m is thus suitable for the current conventional bale heights of balers for agricultural crop.

Preferably, the maximal possible distance difference of the strip storage axle bodies amounts to between 300 and 600 mm, preferably between 400 and 500 mm. The tying material is looped around the strip storage axle bodies forming two to twelve lengths, preferably six to eight lengths in the strip storage device. Strip storage devices with maximal possible distance difference of the strip storage axle bodies between 300 and 600 mm, preferably between 400 and 500 mm, have outer dimensions that can be integrated particular easily into balers. Due to the multiple loops, even for comparatively short axle body distance changes, the required length of the dispensable tying material is achieved and the acceleration of the free axle body is kept low.

Preferably, the strip storage restoring element is embodied as a tension spring. An embodiment as a tension spring enables a simple and inexpensive realization of the strip storage restoring element. In addition, the tension spring can be arranged so as to be relatively easily accessible at the baler so that, in case of a possible defect, it can be exchanged simply and quickly. In this way, the serviceability and thus the operational safety and reliability are increased.

Preferably, the tying device comprises the decoiling device as well as a control device, wherein the decoiling device relative to the pressing channel is stationarily supported and comprises a coiled part of the tying material and at least one brake contact surface. The control device comprises at least one control element which, relative to the pressing channel, is movably supported and controllable by a decoiled part of the tying material and which comprises at least one brake element which is releasable by control of the control element from the brake contact surface. Also, the control device comprises at least one brake element restoring element, restoring the control device into a braking position in which the decoiling device is braked, wherein in the braking position the brake contact surface is contacting at least partially the brake element. In the decoiling device, the tying material supply is stored. A storage roll with tying material comprises a relatively large mass moment of inertia. When removing the tying material from the roll, the latter would be caused to rotate and would continue to rotate after completion of removal. Thereby a minimal strip tension in the tying device may be undershot. Such an afterrolling or coasting is prevented by the present control device which has a releasable brake wherein the brake is released by the strip tension and becomes effective again with decreasing strip tension.

Preferably, the decoiling device comprises tying material in form of a strip roll and a rotatable strip roll carrier carrying the strip roll. By separating the strip roll, which carries the tying material, from the strip roll carrier, the baler can be furnished in a simple way with new tying material.

Advantageously, the decoiling device is rotatable about a decoiling axis of rotation which is orthogonal to the longitudinal center axis of the pressing channel and parallel to a bottom plane. In this context, the bottom plane includes the side of the pressing channel which is closest to the ground in the operating position of the baler. This enables a simpler guiding of the tying material in the tying device. Moreover, the decoiling device can be arranged at the sides or parallel to the sides of the baler. Here, the decoiling device is easily accessible for operators of the baler so that furnishing of the decoiling device with tying material is possible in a simple way. The easy accessibility increases the availability and thus the efficiency of the baler.

Preferably, the control element is pivotably arranged about a control element pivot axis wherein the control element pivot axis is positioned stationarily relative to the pressing channel. Due to the pivotable arrangement of the control element, a simple actuation of the brake or of the brake element by means of the control element can be realized by utilizing the leverage effect. The control element in this context can be moved by comparatively minimal changes in the tension of the tying material.

Advantageously, the control element is movable by an increased strip tension of the tying material in such a way that the brake element is releasable in this way from the brake contact surface. Accordingly, by increasing the strip tension, the brake element is released from the brake contact surface so that the tying material can decoil more easily from the strip roll and the strip tension is lowered again.

Preferably, the control element comprises a guide element that at least partially surrounds a decoiled part of the tying material. In this way, the tying material is guided in or at the control element. This increases the reliability of the control element because the risk of slipping off of the tying material from the guide element is reduced. Particularly preferred, the guide element is designed as an eye. In this case, the tying material is completely enclosed by the eye so that it is reliably held in its place relative to the control element and the decoiling device moreover can fulfill its task with increased reliability.

Advantageously, the brake contact surface is formed by a wall surface of a circular cylinder and the brake element comprises a brake element surface that is complementary to a part of the brake contact surface shaped as a section of a circular cylinder wall surface. The brake element surface acts thus on a brake contact surface that is not part of the strip roll. In this way, the position of the brake contact surface relative to the brake element surface is unchanged upon change of the strip roll. This increases the reliability of the decoiling device. Due to the configuration of the brake contact surface as a cylinder wall-shaped brake contact surface, a lift-off movement of the brake element from the brake contact surface can take place in a plane which is parallel to the movement of the control element. In this way, the transmission of the movement from the control element to the brake element is facilitated.

Preferably, the brake restoring element is embodied as a spring. By using a spring, the force with which the brake element is acting on the brake contact surface in a braking position can be adjusted to the conditions of use of the baler. By adaptation of the spring to the prevailing conditions of use of the baler, the reliability of the baler can be improved.

In a preferred embodiment, the control element and the brake restoring element are formed as one piece. This simplifies the configuration of brake restoring element and control element. Particular preferred, in this case the control device can be restored into the braking position by the weight force which is acting on the control element. In this context, a weight which is correlated with the control element acts as a restoring element of the control device. In such a configuration of the control element, a further restoring element, for example, embodied as a spring, is not needed. However, a restoring element, for example, in the form of a spring element, can be at least assisted by the action of the weight force of the control element or of a weight arranged at the control element so that the separate restoring element is less strongly loaded.

Preferably, the control device comprises a transmission device which is arranged between the control element and the brake element and generates a step-up transmission or reducing transmission. In this way, it is possible to step up small travels of the control element into large travels of the brake element and, conversely, to reduce them. The transmission device with a corresponding step-up transmission or reducing transmission can be selected in accordance with the requirements of the baler.

Particularly preferred, the transmission arrangement comprises a length-adjustable control lever. In this way, the sensitivity of the control device can be influenced in use. This facilitates the adaptation to the given conditions and thus leads to a more reliable baler with higher availability.

Advantageously, the control element is arranged between the decoiling device and a deflection element which deflects a portion of the decoiled part of the tying material. The arrangement of the control element between decoiling device and deflection element reduces the risk of torsion of the strip-shaped tying material and provides more possibilities to employ the weights as restoring element. By use of the deflection element, the decoiling device and the control element can also be arranged relatively independent of the conditions and requirements of the remaining tying devices in the baler. In particular, the control element can be arranged such that the weight force which is acting on the control element is oriented so as to be acting in a direction which is advantageous for the function of the control device.

BRIEF DESCRIPTION OF THE DRAWINGS

Further details and advantages of the invention can be taken from the schematically illustrated embodiments described in the following. It is shown in:

FIG. 13a to FIG. 13i a schematic illustration of the steps of a progression of a tying cycle with illustration of the position of the parts of a tying device on a tying table, namely beginning with FIG. 13a in an initial position, continuing with FIGS. 13b, 13c, 13d, 13e, 13f, 13g, 13h, and ending with FIG. 13i in the initial position;

FIG. 25 an overview illustration of several strip guiding elements at a guide carrier element.

DESCRIPTION OF PREFERRED EMBODIMENTS

The features of the embodiments explained in the following can be subject matter of the invention individually or in other combinations than illustrated or described, however always at least in combination with the following features: baler for agricultural crop with a pressing channel and with a needle rocker, which is pivotably arranged about a rocker pivot axis, arranged in a rocker pivot axis plane that is orthogonal to a longitudinal center axis of the pressing channel, and which is driven by at least one drive arrangement, which comprises at least one tying needle that is movable by pivoting of the needle rocker through the pressing channel, wherein the drive arrangement comprises a drive element, rotatably supported about a drive axis of rotation, and a drive lever which is eccentrically arranged thereat, characterized in that the drive arrangement comprises a coupling device which is pivotably arranged about a coupling pivot axis positioned stationarily relative to the pressing channel, wherein the coupling device is arranged at a distance from the rocker pivot axis of the needle rocker at the needle rocker, and wherein the drive lever is arranged at the coupling device.

Figure 1:
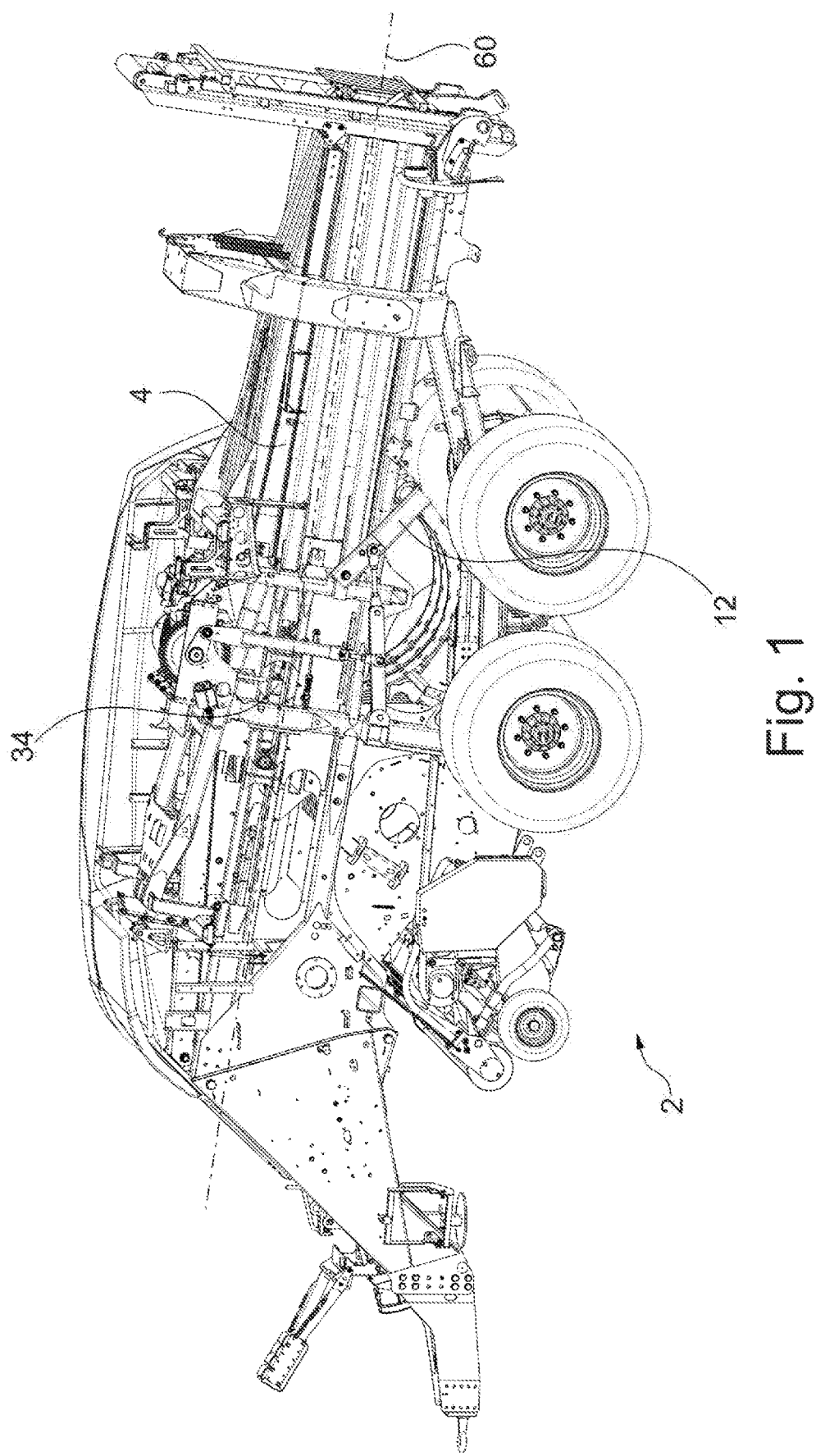
FIG. 1 an overview illustration of an embodiment of a baler according to the invention for agricultural crop.
Figure 2:
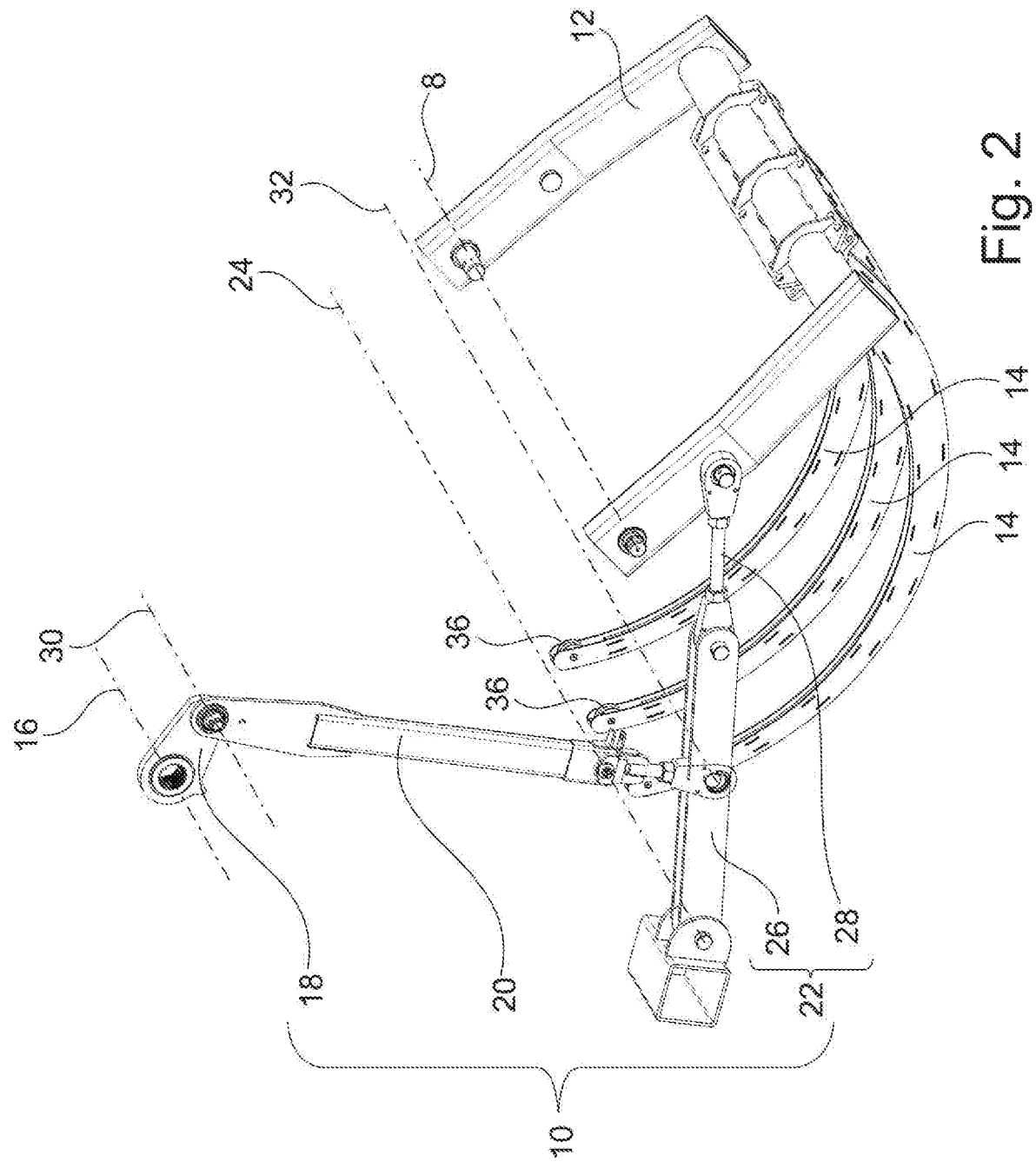
FIG. 2 an overview illustration of an embodiment of a needle rocker as well as of a drive element, of the drive lever, and of the coupling device.

FIG. 1 shows a baler 2 according to the invention for agricultural crop. In operation, the baler 2 is connected to an agricultural tractor and, as it travels, presses continuously by means of a pressing piston 34 bales which are enveloped by a looping means in a pressing channel 4 and finally exit from the pressing channel 4 through an opening which is facing away from the pressing piston 34. The pressing channel 4 has a rectangular cross section and a longitudinal center axis 60 of the pressing channel is extending through its center.

A needle rocker 12 as part of the baler 2 is illustrated in FIGS. 2 to 5 in different positions. The needle rocker 12 with tying needles 14 is pivotably supported about a rocker pivot axis 8. The needle rocker pivot axis 8 is stationary relative to the pressing channel 4. The needle rocker 12 is driven by a drive arrangement 10. The drive arrangement 10 comprises a drive element 18 that is rotatably supported about a drive axis of rotation 16 that is stationary relative to the pressing channel 4. A drive lever 20 is rotatably supported about a drive lever axis of rotation 30 at the drive element 18.

The drive lever 20 is connected with the needle rocker 12 by a coupling device 22. The coupling device 22 comprises a first coupling lever 26 and a further coupling lever 28. The first coupling lever 26 is arranged to be pivotable about a coupling pivot axis 24 wherein the coupling pivot axis 24 is stationary relative to the pressing channel 4. On the one hand, the further coupling lever 28 is arranged also pivotably at the first coupling lever 26 and, on the other hand, arranged pivotably and at a distance relative to the rocker pivot axis 8 at the needle rocker 12. In this context, the drive lever 20 is pivotably secured about the drive coupling pivot axis 32 at the first coupling lever 26.

The rocker pivot axis 8 is positioned in a rocker pivot axis plane to which the longitudinal center axis of the pressing channel 60 is orthogonal. The drive axis of rotation 16, the drive lever axis of rotation 30, the coupling pivot axis 24, and the drive coupling pivot axis 32 are positioned parallel to the rocker pivot axis 8 in this context.

Figure 7:
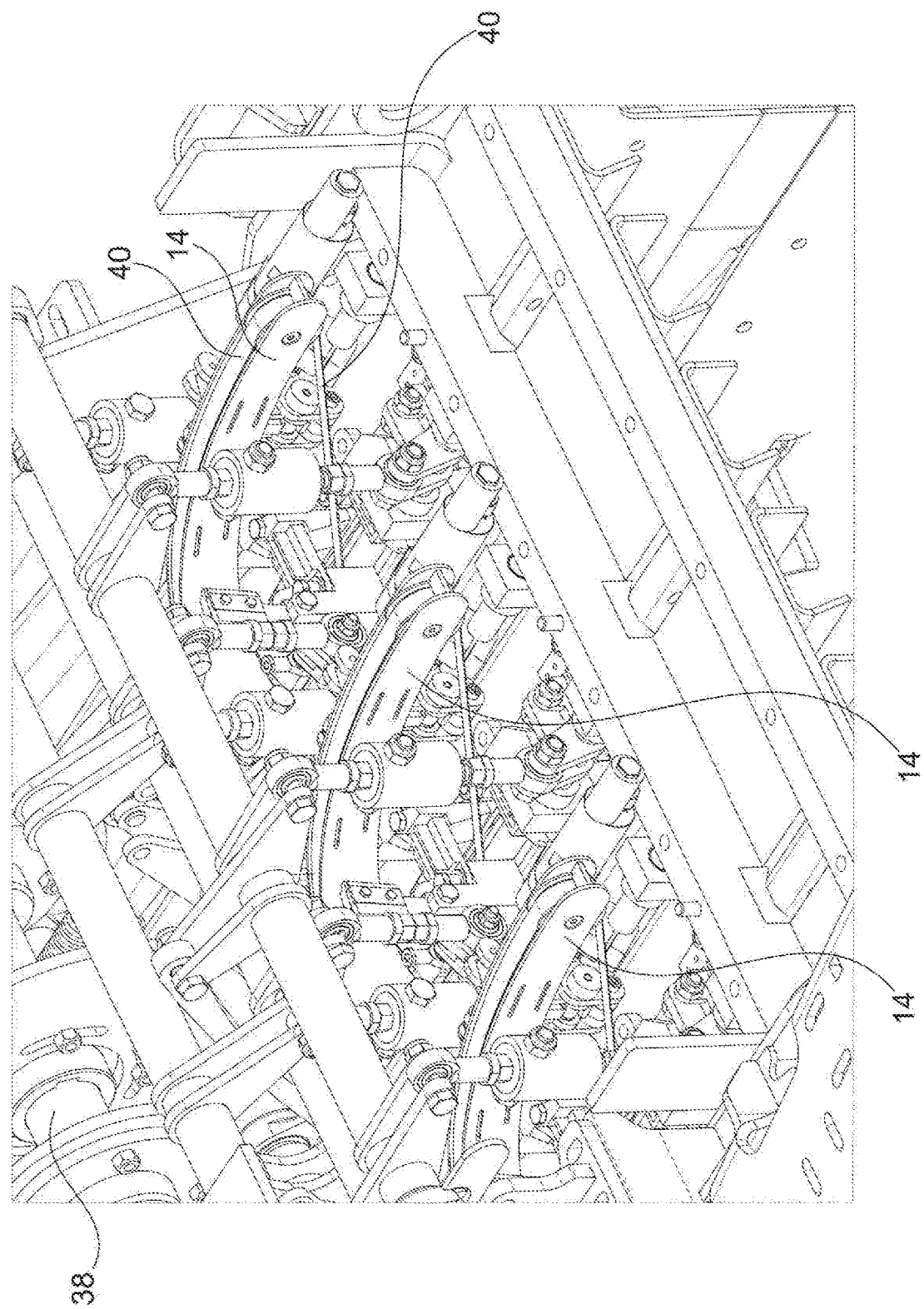
FIG. 7 an overview illustration of an embodiment of a tying table with tying needles of the needle rocker according to FIG. 2 at top dead center.

The drive element 18 is arranged at a control shaft 38 (compare FIG. 7). This control shaft 38 controls with one revolution a tying cycle. During a tying cycle, two ends of a looping means enveloping the compressed bale are connected to each other. Part of the tying cycle is guiding of the looping means through the pressing channel 4 by means of the tying needles 14. The needle rocker 12 comprises three tying needles 14 in FIG. 2. They each comprise a guide roller 36.

Figure 3:
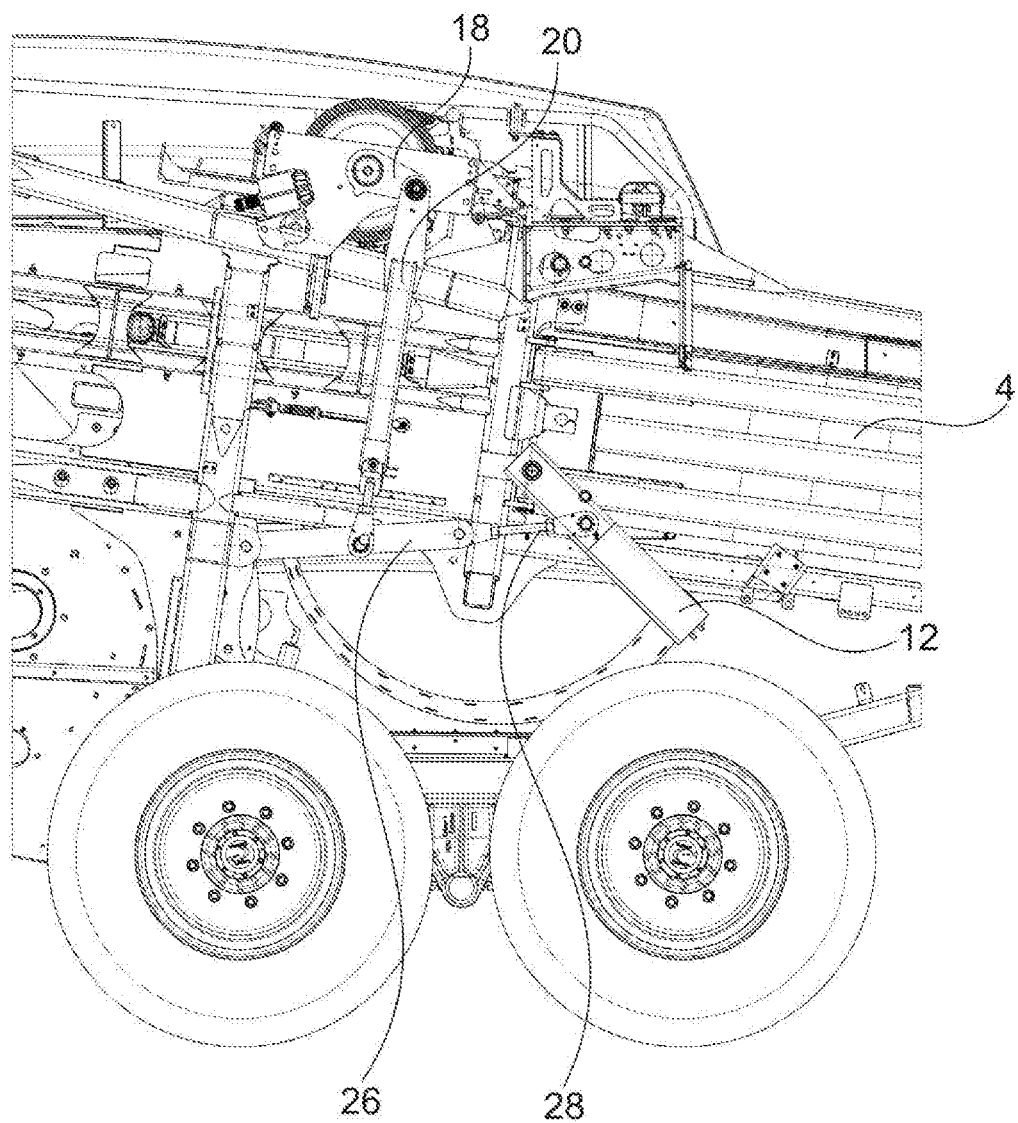
FIG. 3 a side view of the needle rocker according to FIG. 2 in the initial position at the baler.
Figure 4:
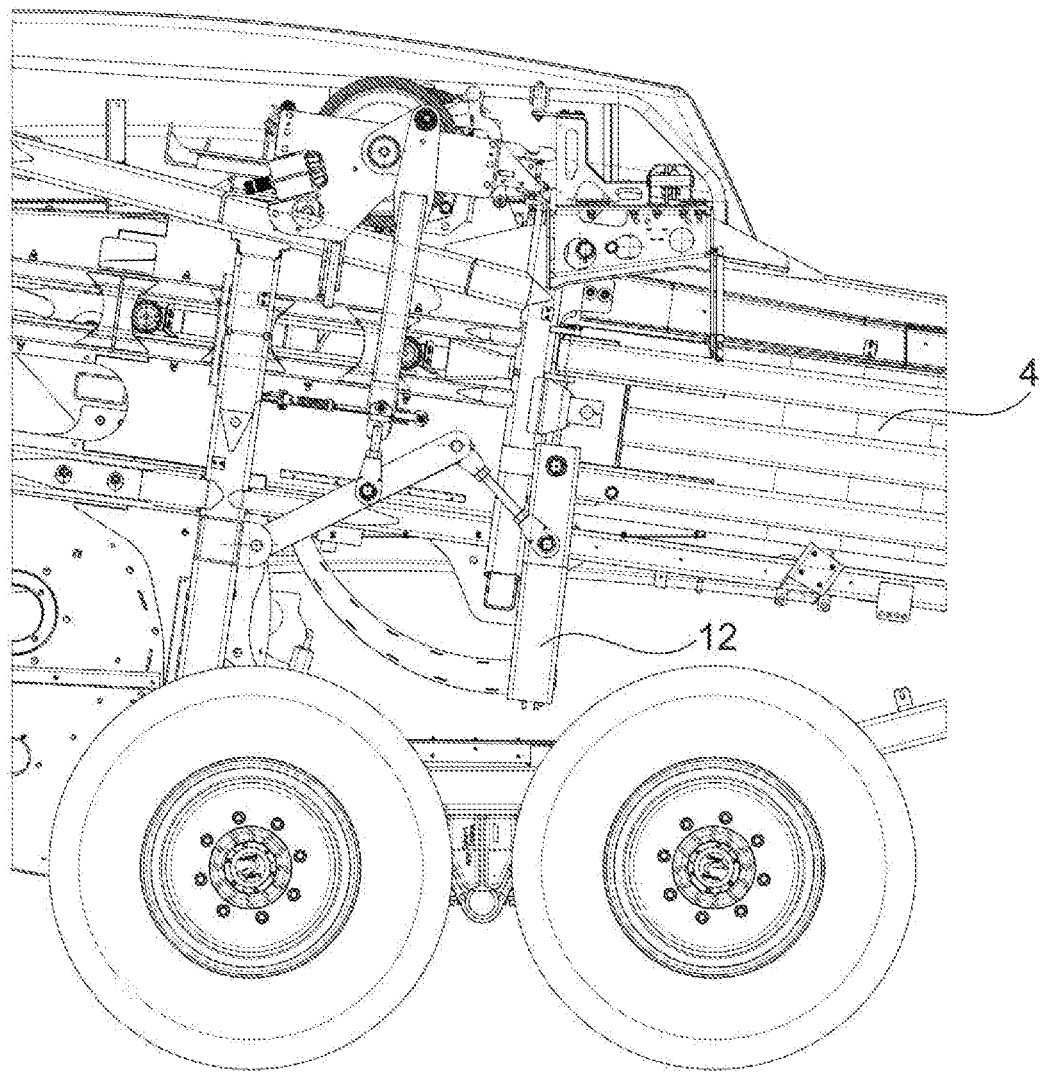
FIG. 4 a side view of the needle rocker according to FIG. 2 between initial position and top dead center at the baler.
Figure 5:
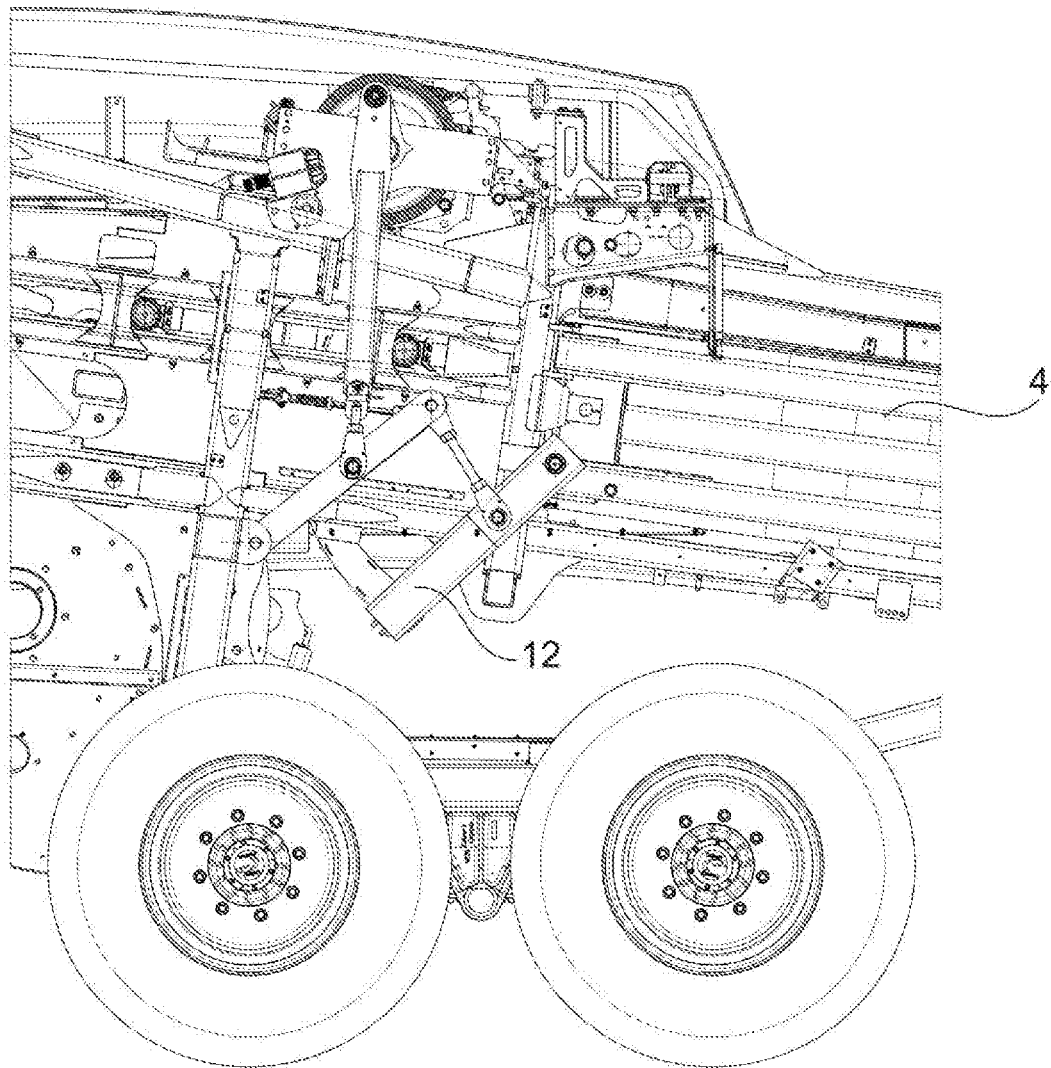
FIG. 5 a side view of the needle rocker according to FIG. 2 at top dead center at the baler.

FIGS. 3 to 5 show the needle rocker 12 in three different positions. In FIG. 3, the needle rocker 12 is in an initial position. Here, the tying needles 14 are positioned circumferentially completely outside of the pressing channel 4. The needle rocker 12 is located in this initial position before and after each tying cycle. It is characteristic that the coupling pivot axis 24 and the region of the coupling device 22 arranged at the rocker 12 have a maximal possible distance from each other, i.e., the coupling device 22 is stretched. At the same time, the drive axis of rotation 16, the drive lever axis of rotation 30, and the coupling pivot axis 24 are not lying within a plane. Drive element 18 and drive lever 20, when viewed as a unit, are not stretched.

During a tying cycle, the needle rocker 12 is pivoted at constant angle velocity of the drive element 18 faster from the initial position into top dead center of the needle rocker 12 (compare FIG. 5) as if drive element 18 and drive lever 20 as a unit were in a stretched position in the initial position.

Figure 6:
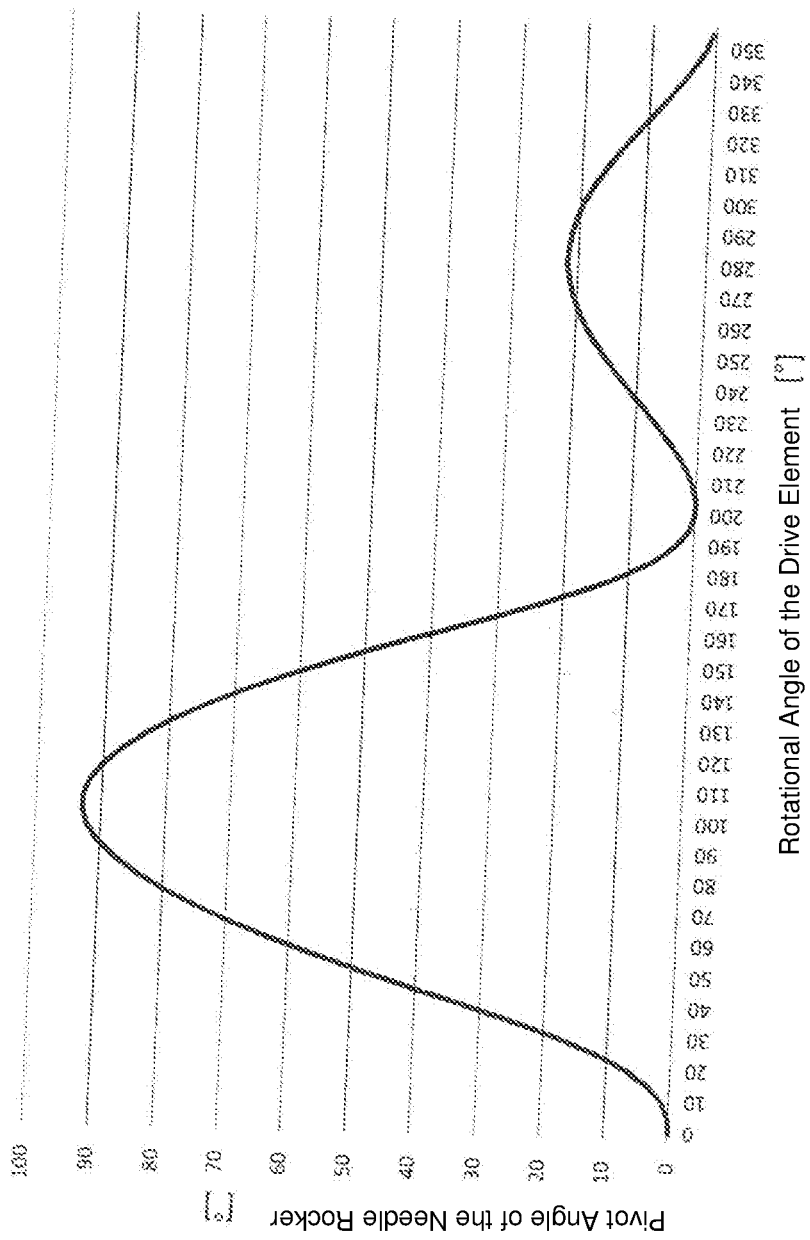
FIG. 6 a pivot angle to rotational angle diagram for the needle rocker movement.

The result is that upon return of the needle rocker 12 into the initial position, the coupling device 22, since it had already been stretched at a rotary angle of the drive element 18 of less than 360°, is again shortened by a minimal amount. In this context, the tying needles 14 after completion of the tying cycle are again guided partially into the pressing channel 4 before the initial position of the needle rocker 12 is reinstated. This movement course of the needle rocker 12 is illustrated by the movement diagram in FIG. 6. In this context, the pivot angle of the needle rocker 12 as well as the rotary angle of the drive leg 18 equals zero in the initial position.

FIG. 7 shows a tying table of the baler 2 above the pressing channel 4. Also, parts of the three tying needles 14 are illustrated which guide a strip-shaped tying material 40 while the needle rocker 12 is located at top dead center.

Figure 8:
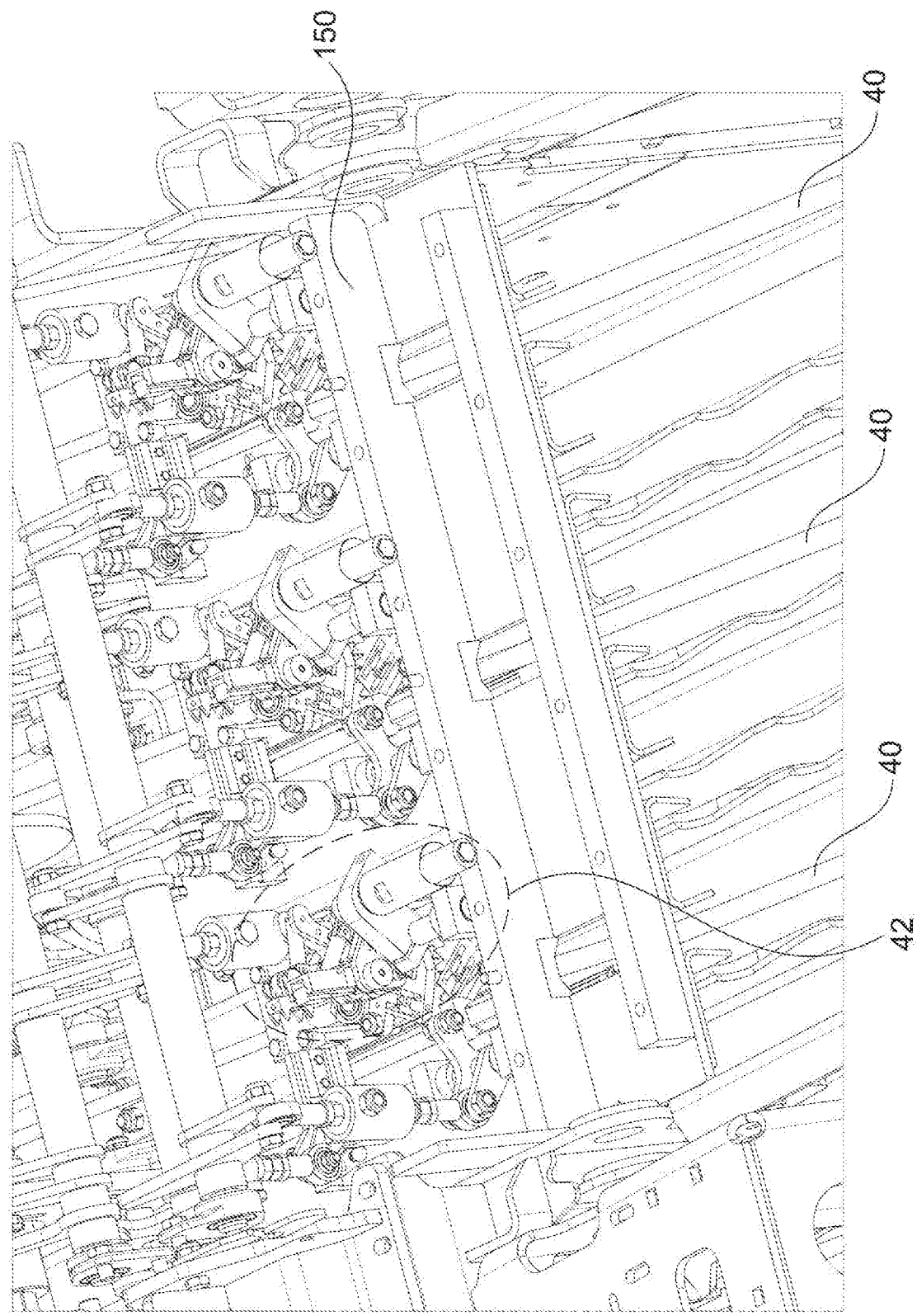
FIG. 8 an overview illustration of the tying table between two tying cycles.

FIG. 8 shows a further perspective overview illustration of the tying table with three material fusion generators 42 and the strip-shaped tying material 40 which is to be joined by material fusion. In this illustration, the needle rocker 12 which is not visible here is in the initial position and the bale is compressed by the pressing piston 34. A portion of the tying devices which are arranged on the tying table are illustrated between two tying cycles.

Figure 9:
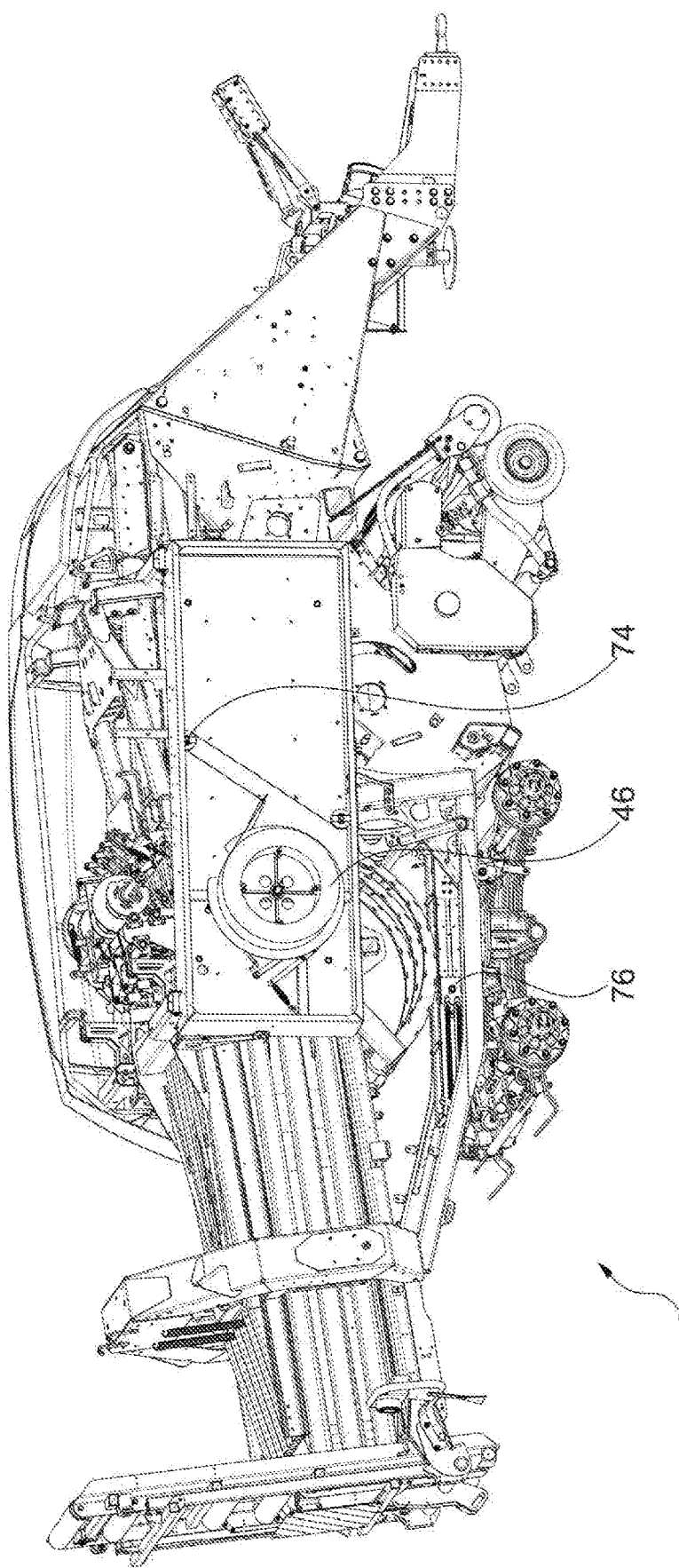
FIG. 9 an overview illustration of the baler according to FIG. 1 with decoiling device.
Figure 10:
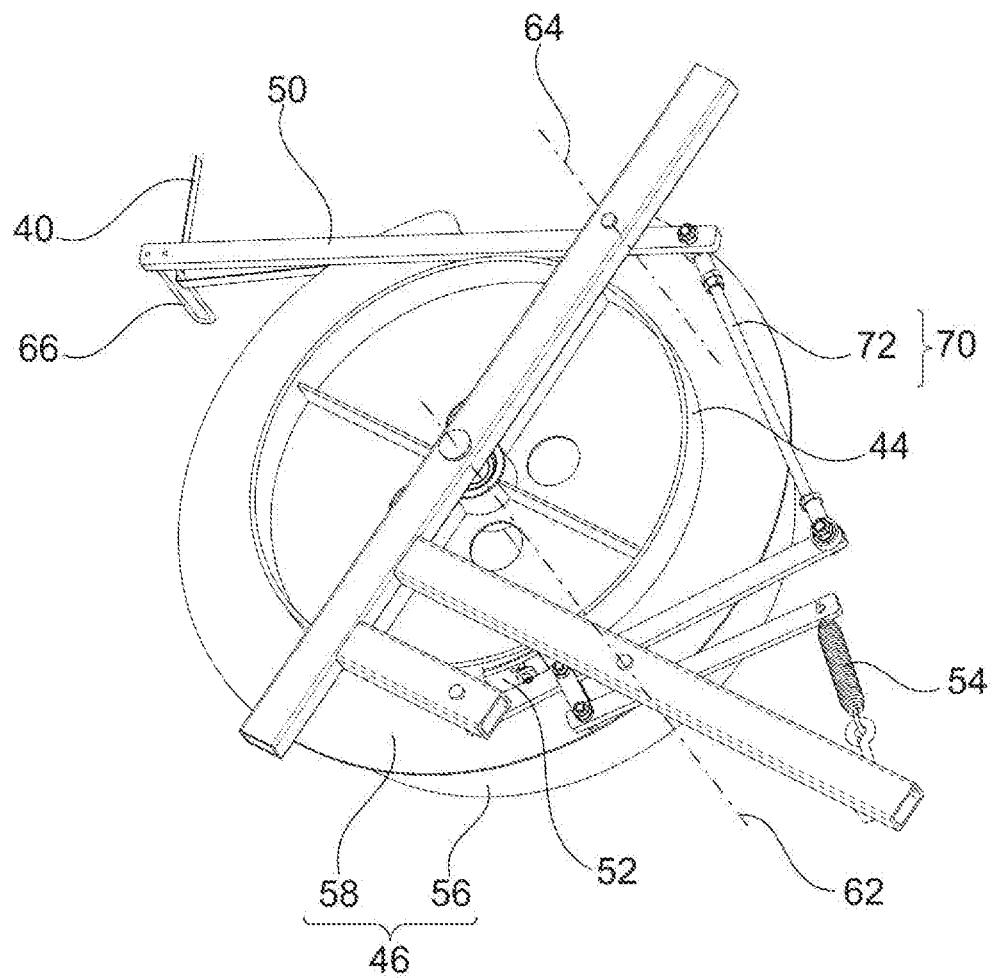
FIG. 10 an overview illustration of the decoiling device according to FIG. 9 and a control device.
Figure 11:
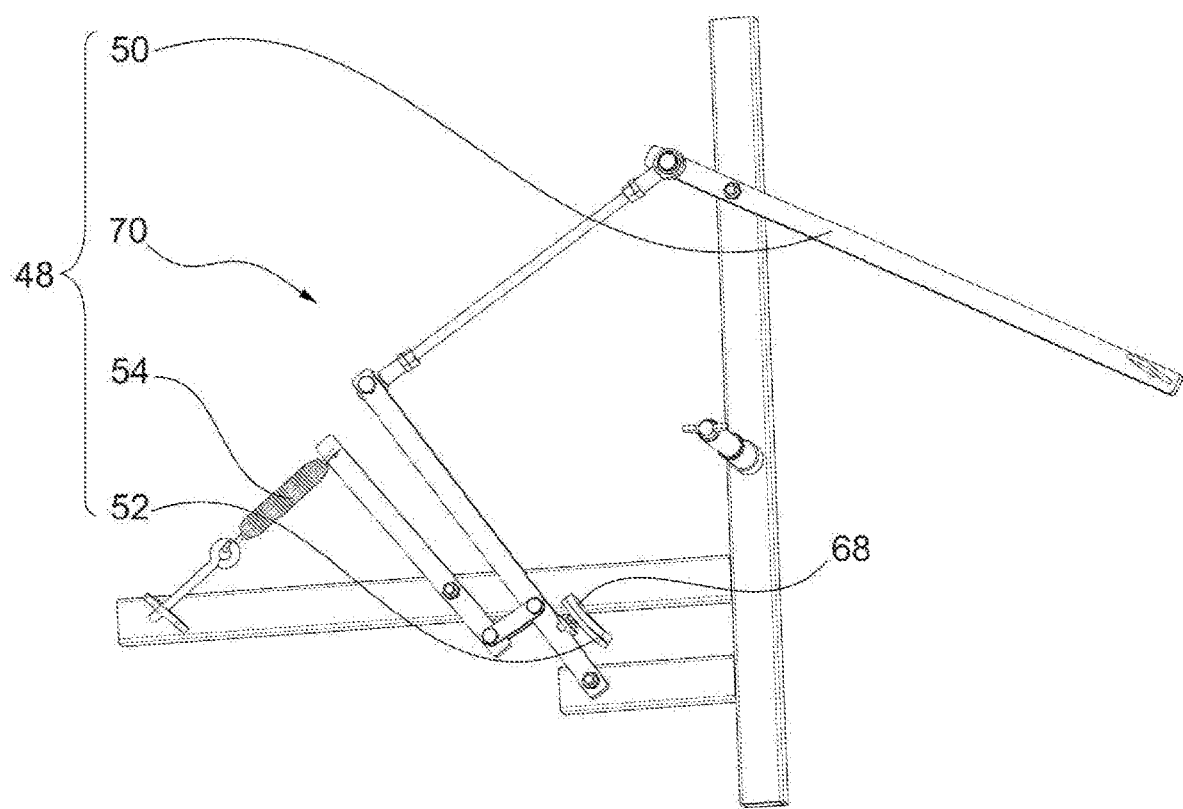
FIG. 11 an overview illustration of the control device according to FIG. 10.

FIG. 9 is an overview illustration of the baler 2 according to the invention and shows relative to FIGS. 1, 3, 4, and 5 its opposite side. Attached to this side is a decoiling device 46 which stores a strip-shaped tying material 40 for enveloping the bales. Furthermore, parts of a control device 48 are illustrated which are illustrated in the following FIGS. 10 and 11 in detail. FIG. 10 shows relative to FIG. 9 the rear side of the decoiling device 46 and of the control device 48. The decoiling device 46 comprises an exchangeable strip roll 56 and a strip roll carrier 58. The decoiling device 46 is rotatable about a decoiling axis of rotation which is stationary relative to the pressing channel 4.

The decoiling device 46 comprises a brake contact surface 44 which has the shape of a circular cylinder wall surface. In a braking position in which the control device 48 is illustrated in FIG. 10, a brake element 52 is contacting the brake contact surface 44 with a brake element surface 68 which is part of the control device 48. By means of a transmitting device 70, the brake element 52 is connected with a control element 50. A guide element 66 is arranged at the control element 50 and is embodied as an eye.

Through this guide element 66, the strip-shaped tying material 40 is extending after it has been decoiled from the decoiling device 46. An increase of the strip tension causes pivoting of the control element 50 about a control element pivot axis 64 which is positioned parallel to the decoiling axis of rotation 62. This pivot movement which is transmitted by the transmission device 70 at a reducing rate to the brake element 52 leads to release of the brake element 52 with the brake element surface 68 from the brake contact surface 44. By means of a brake restoring element 54, the transmission device 70 is loaded with a force which is acting opposite to this movement. As the strip tension decreases, the brake restoring element 54 causes a return of the control device 48 into the braking position.

Figure 12:
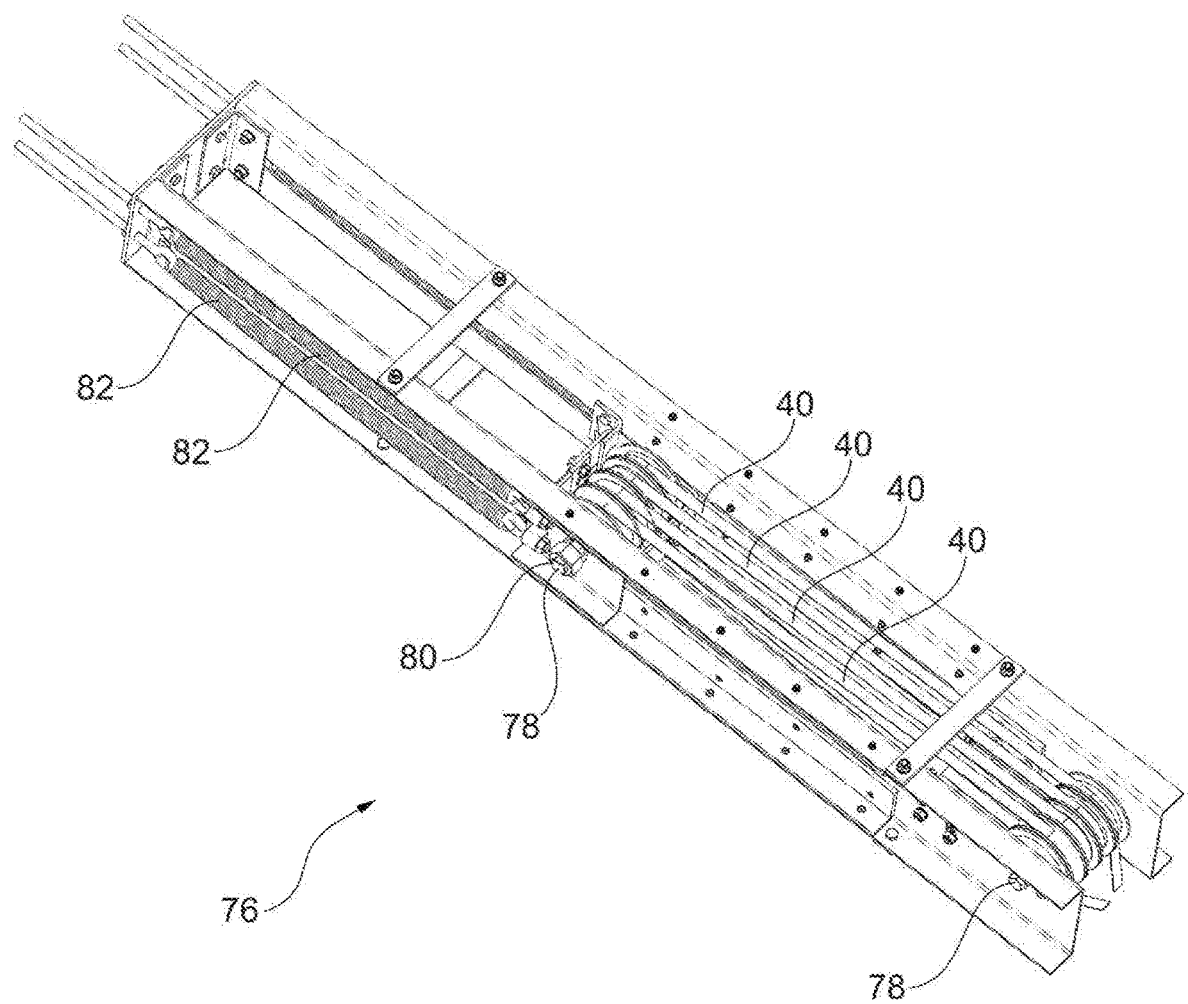
FIG. 12 an overview illustration of an embodiment of a strip storage device.

For adjusting the sensitivity of the control device 48, a control lever 72 which is length-adjustable is arranged at the control element 50. In addition to the decoiling device 46 and the control device 48, FIG. 9 shows a deflection element 74 that deflects a portion of the strip-shaped tying material 40 after having passed through the guide element 66. FIG. 9 shows below the pressing channel 4 a strip storage device 76 to which the strip-shaped tying material 40 is supplied after it has been decoiled from the decoiling device 46. This strip storage device 76 is illustrated in detail in FIG. 12.

The strip storage device 76 has two strip storage axle bodies 78. On the free axle body there are four and on the additional strip storage axle body there are five pulleys. The tying material 40 which is located between decoiling device 46 and material fusion generator 42 winds around the pulleys of the strip storage axle bodies 78 like a block and tackle arrangement. In this context, the strip-shaped tying material 40 is guided alternately and in each case about half a side of the circumference of the pulleys of the different strip storage axle bodies 78. One of the strip storage axle bodies 78 is a movably supported free axle body 80. It is loaded by a strip storage restoring element 82 with a force which effects a movement that enlarges the distance of the two strip storage axle bodies 78 relative to each other. By enlarging the distance, the length that is stored by the strip storage device 76 of the strip-shaped tying material 40 is enlarged by multiple times the difference of the distances of the strip storage axle bodies 78 prior to and after the distance enlargement.

Once the strip storage restoring elements 82 have gradually increased the distance of the two strip storage axle bodies 78 between two tying cycles, the strip storage device 76 makes available the quantity of strip-shaped tying material 40 that is required for a movement of the correlated tying needles 14 at the needle rocker 12 from their initial position to top dead center for guiding the tying material to the tying table. At the same time, the strip storage device 76 prevents great accelerations of the decoiling device 46 because, due to the strip storage restoring elements 82, the strip-shaped tying material 40 is decoiled only gradually from the decoiling device 46 with a moderate strip tension that moves the control device 48.

FIG. 13 shows a series of basic illustrations which illustrate the progression of a tying cycle and the function of the components arranged on the tying table. Illustrated are respectively a forward clamping device 94, a cutting device 100, a counter holder 86, a hold-down device 118, a pivot element 88, and a counter pivot element 92, a rearward clamping device 110, a friction welding device 132 with a weld clamping device 128 as well as a nozzle 136 of the cooling device.

The nine Figure parts 13a to 13i illustrate respectively the afore mentioned components of a tying device on the tying table. In this context, according to the illustrations, the pressing piston 34 of the baler 2 is located to the right of the illustrated components and the opening of the pressing channel 4 through which the compressed bales will exit to the left thereof. A first end of the strip-shaped tying material 40 is indicated with a dashed line, a further part thereof in a solid line.

FIG. 13a shows an initial position of the tying device in which the strip-shaped tying material 40 is clamped by the forward clamping device 94. In this initial position, the strip-shaped tying material 40 loops around the counter holder 86 in U-shape and extends along its further course in the direction of the rear upper transverse edge of the compressed bale. In this position, the further illustrated components are in positions spaced apart from the strip-shaped tying material 40.

FIG. 13b shows that the pivot element 88 and the counter pivot element 92 at the beginning of the tying cycle are pivoted into the illustrated strip plane. Prior to this (compare FIG. 13a) they were positioned outside of a strip plane in which the tying device these illustrations is sectioned. Simultaneous with pivoting of the pivot element 88 and of the counter pivot element 92 the friction welding device 132 is activated. For this purpose, the air supply to one of the compressed air motors 134 driving the friction welding devices 132 is activated.

FIG. 13c shows in a subsequent step the rearward clamping device 110 lowered and that it clamps the strip-shaped tying material 40 on the counter pivot element 92. This makes it possible that the forward clamping device 94 in a subsequent step (compare FIG. 13d) can open without the securing action of the part of the strip-shaped tying material 40 looped around the bale being affected. Simultaneous with opening of the forward clamping device 94, a holding-down device 118 is pivoted into the illustrated strip plane. It ensures that the strip section which is positioned to the right of the rearward clamping device 110 remains arranged below the friction welding device 132.

FIG. 13e shows subsequent thereto a further loop-shaped strip section (illustrated as solid line) of the same tying material that is guided by the tying needle 14 through the pressing channel 4 into the schematically illustrated area of the tying table. Enabled by opening the forward clamping device 94, the counter holder 86 evades temporarily the tying material and is arranged in this context displaced out of the illustrated strip plane.

While the needle rocker 12 is positioned in the region of top dead center, the friction welding device 132 closes and the weld clamping device 128 together with it. Thus, the strip-shaped tying material 40 is positioned in two layers between the friction welding device 132 or the weld clamping device 128 and the pivot element 88. As soon as contact between the two clamped layers and the friction welding device 132 is produced, the welding process starts due to the already initiated activation of the compressed air motor 134 which drives the friction welding device 132.

FIG. 13f shows that the welding process continues to this next step. The tying needle 14 has left the region of the tying table; in this context, the counter holder 86, after its return into the strip plane, has caught the loop of the tying material 40 that has been guided before by the tying needle 14. Subsequently, the forward clamping device 94 and thus the cutting device 100 are closed, the latter however trailing the clamping movement. Thus, the loop of the strip-shaped tying material 40 is cut between friction welding device 132 and forward clamping device 94. The part of the strip-shaped tying material 40 whose ends are positioned underneath the weld clamping device 128 envelopes the finish-pressed bale. The strip section which is illustrated in solid line is fixed during the continued welding process by the closed weld clamping device 128.

FIG. 13g shows the components of the tying device after the friction welding device 132 has been stopped. It remains closed in this context, as does the weld clamping device 128. The compressed air which has been supplied before to the compressed air motor 134 for the friction welding device 132 is now supplied to the nozzle 136 which cools the weld connection. The friction welding device 132 and the weld clamping device 128 remain closed because in this way a relative movement of the still hot welded strip section is prevented. FIG. 13g shows also that the rearward clamping device 110 is opened.

FIG. 13h shows the same components after the friction welding device 132 and the weld clamping device 128 have opened. The ends of the strip-shaped tying material 40 enveloping the bale hold on to each other due to the produced and cooled material-fused connection. Due to the cooling action, the time required for cooling the weld location is reduced. In this way, the compressed bale is looped around with material fusion. In the following (compare FIG. 13i) the pivot element 88 and the counter pivot element 92 are pivoted out of the illustrated strip plane. In this way, they are no longer positioned between the strip-shaped tying material 40 enveloping the bale and the agricultural crop and the enveloped bale can be moved out of the pressing channel 4 in a shape stable form.

When pivoting the pivot element 88 and the counter pivot element 92, also the air supply which had been guided last to the nozzle 136 is terminated. The section of the strip-shaped tying material 40 which is clamped after closing of the cutting device 100 (compare FIG. 13f) by the forward clamping device 94 extends in accordance with the strip section illustrated in dashed line in FIG. 13a. In this context, this section with increasing length of the bale to be compressed is deflected to a growing angle by the counter holder 86 until it is resting in a U-shape at the counter holder when reaching a maximum bale length. When a new tying cycle is triggered, the illustrated steps of the tying cycle will take place again as described.

Figure 14:
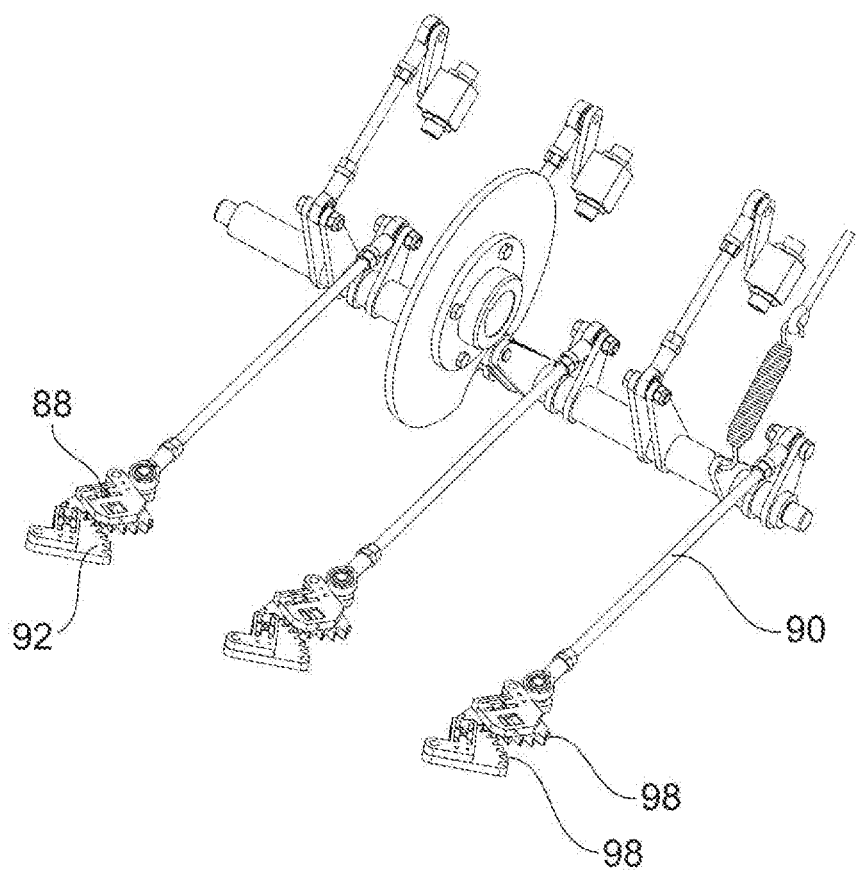
FIG. 14 an overview illustration of an embodiment of a pivot element inclusive of a pivot element drive.

The following FIGS. 14 to 23 show in overview illustrations the components of the tying device symbolically illustrated in FIG. 13. FIG. 14 shows three pivot elements 88 and three counter pivot elements 92. Each pivot element pair, comprised of a pivot element 88 and a counter pivot element 92, is correlated in this context with a tying device. Corresponding to the description of the tying cycle, the pivot element pairs can be introduced between strip-shaped tying material 40 and the bales to be pressed and positioned on the tying table. A pivot element control lever 90 is connected pivotably to the pivot element 88. The pivot element 88 pivots about a pivot axis which is positioned in a pivot axis plane relative to which the longitudinal center axis 60 of the pressing channel is positioned orthogonally. The counter pivot element 92 is pivotable respectively about a parallel pivot axis which in the direction of the longitudinal center axis of the pressing channel is spaced from the first pivot axis. The pivot movement is transmitted from the pivot element 88 to the counter pivot element 92 by partial toothed rings that are provided at the pivot elements 88 as well as at counter pivot elements 92. The partial toothed rings 98 of pivot element 88 and counter pivot element 92 are in engagement, respectively, so that a pivot movement of the pivot element 88 causes an equivalent pivot movement of the counter pivot element 92.

FIG. 14 shows also a lever shaft at which the pivot element control lever 90 is arranged. A pivot movement of this lever shaft is guided by an illustrated cam disk fastened to the control shaft 38. In addition to the movement of the pivot element pair by the illustrated lever shaft also a compressed air valve 144 is controlled which controls the air supply to the compressed air motor 134 or to the nozzle 136. The lever shaft is restored by a spiral spring against the cam disk.

Figure 15:
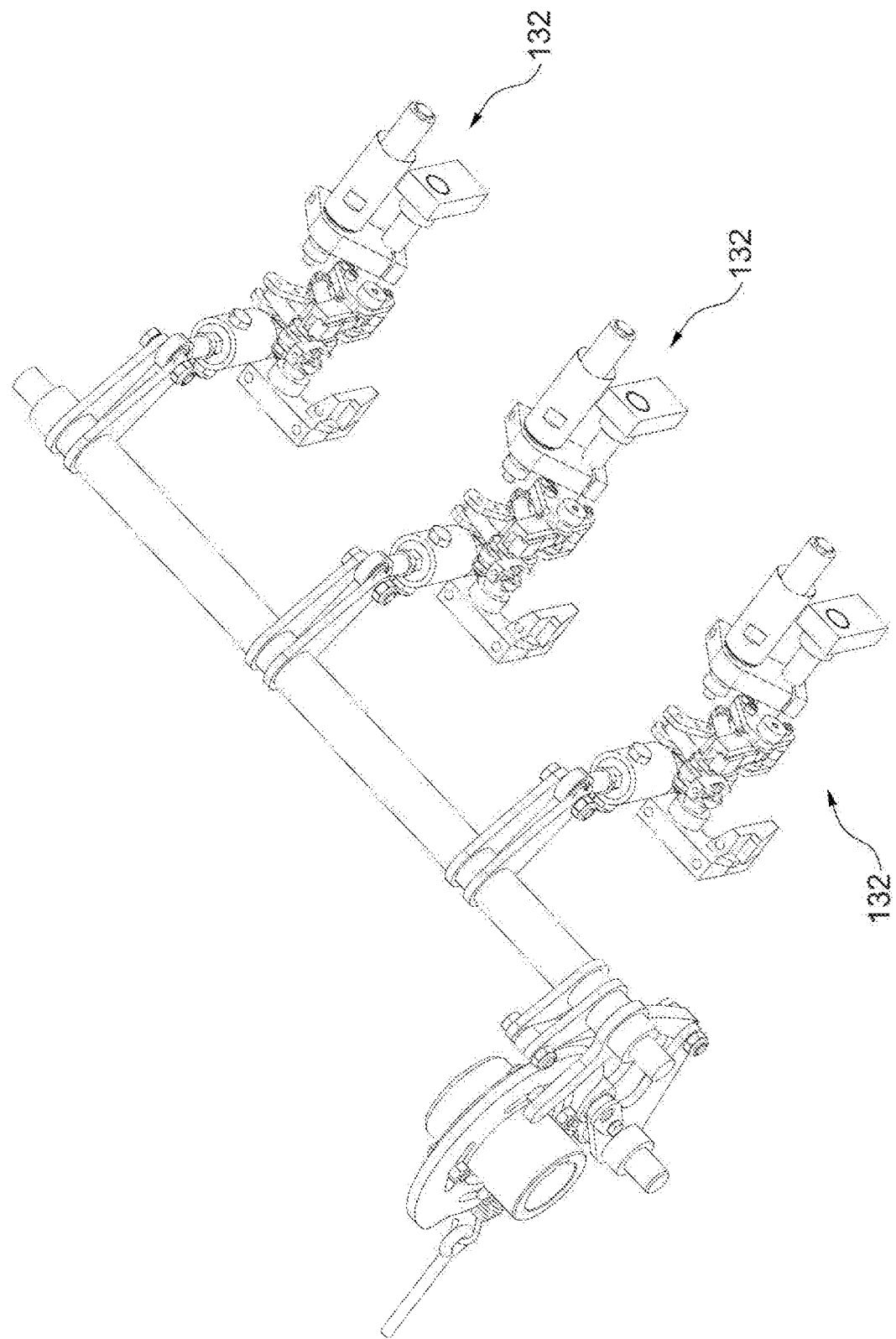
FIG. 15 an overview illustration of an embodiment of a material fusion generator inclusive of a material fusion generator drive.

FIG. 15 shows three friction welding devices 132 which are assigned to a tying device, respectively. Illustrated are the correlated compressed air motor 134, a welding element 126 contacting the tying material to be fused during the welding process as well as a weld clamping device 128. These components are pivotably attached about a welding device pivot axis 130 to the tying table.

Figure 16:
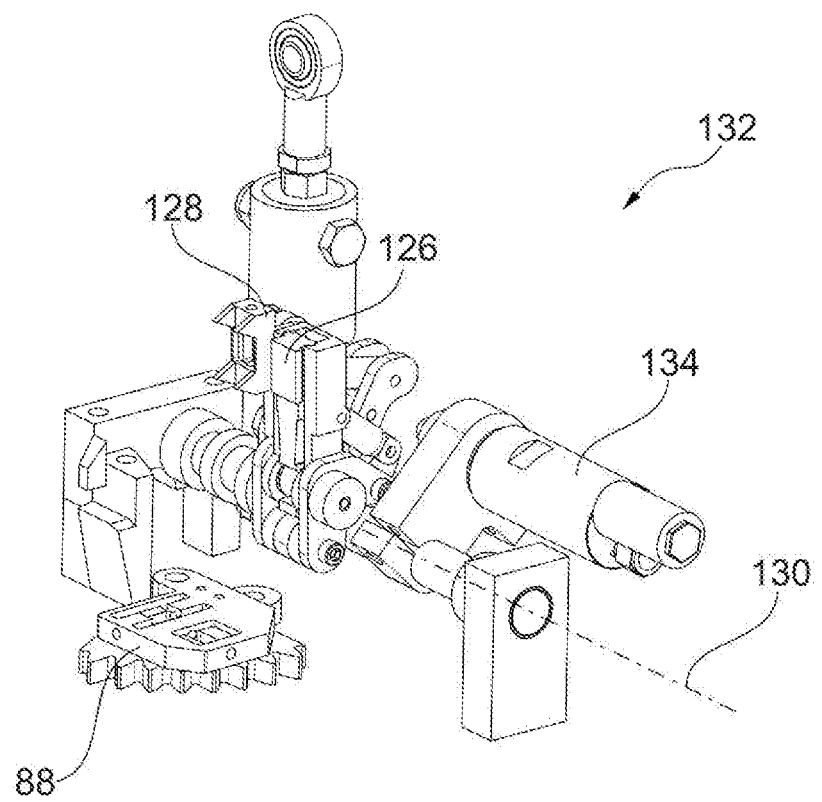
FIG. 16 an overview illustration of the open material fusion generator according to FIG. 15.
Figure 17:
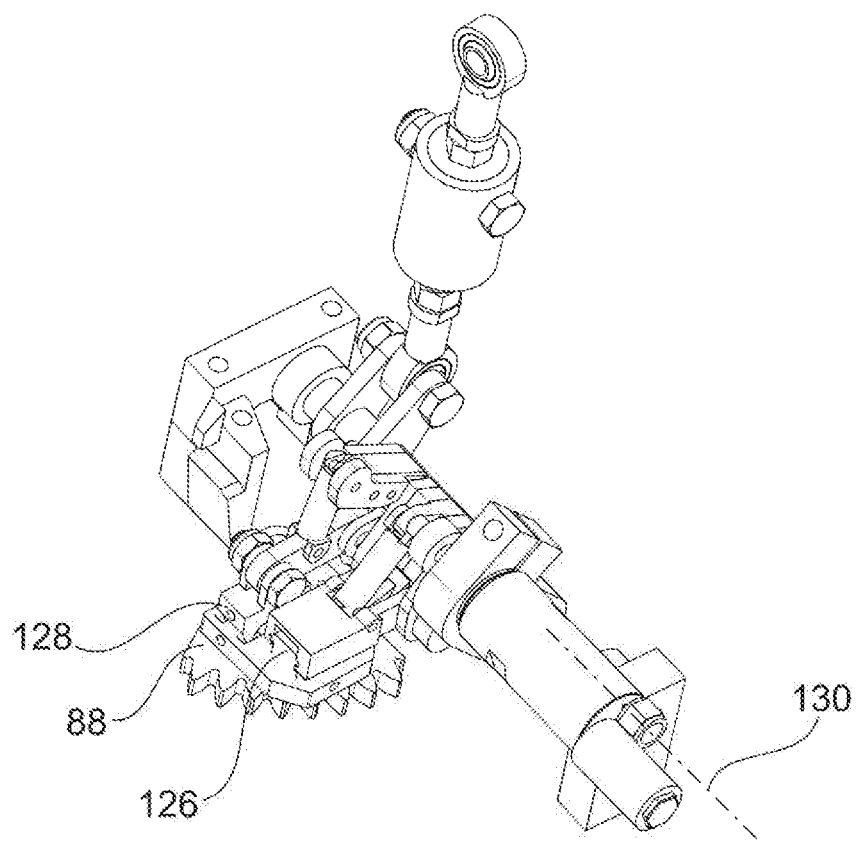
FIG. 17 an overview illustration of the closed material fusion generator according to FIG. 15.
Figure 18:
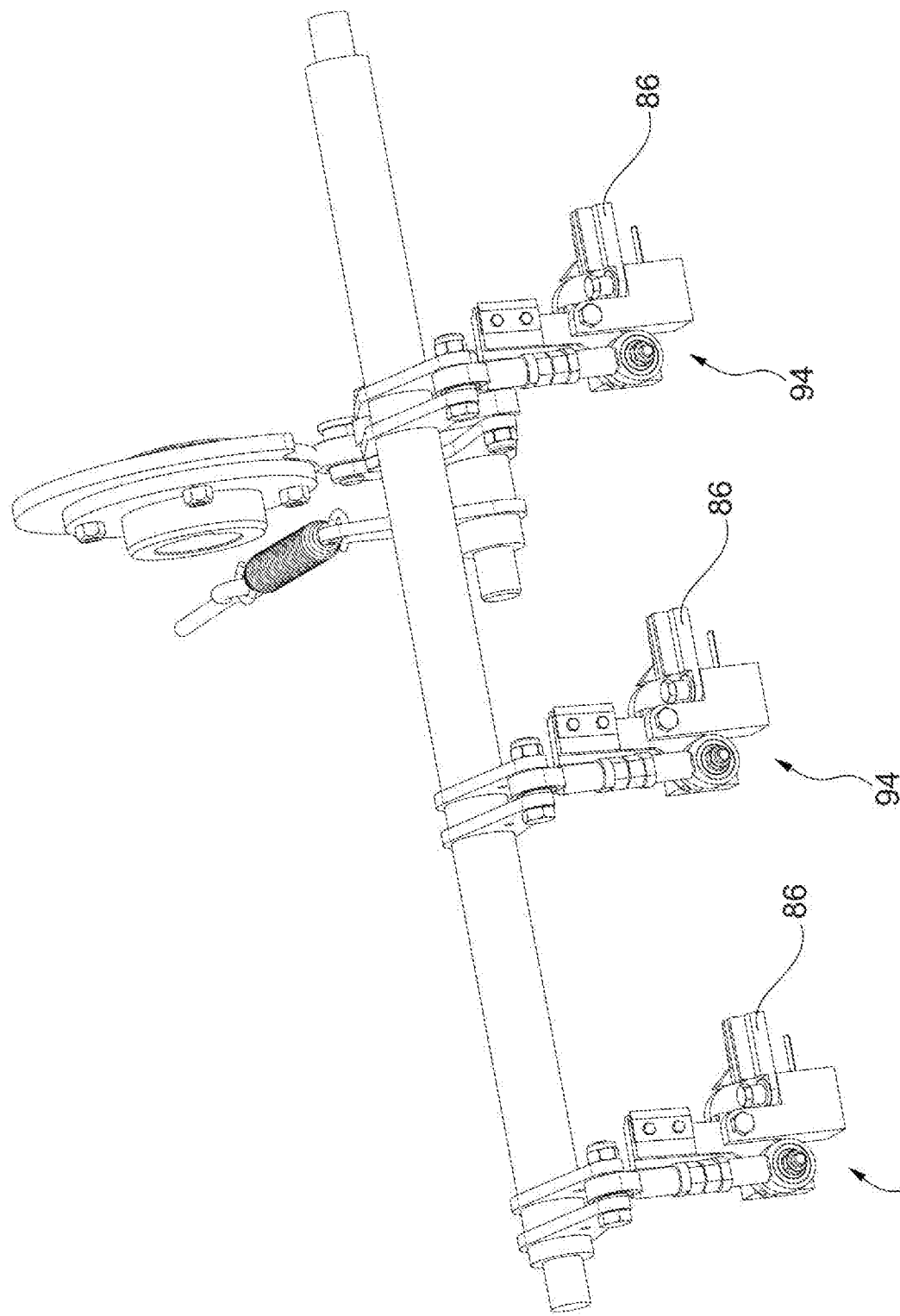
FIG. 18 an overview illustration of an embodiment of a forward clamping device inclusive of a first clamping device drive.

FIGS. 16 and 17 respectively show the friction welding device 132 together with the pivot element 88 which is pivoted between strip-shaped tying material 40 and bale. In an open position of the friction welding device 132 (compare FIG. 16), these two components have no effect on each other, independent of whether the compressed air motor 134 is activated or not. Exclusively the high-frequency movement of the welding device 126 is dependent on the operation of the compressed air motor 134.

FIG. 17 shows again the friction welding device 132 and the pivot element 88 wherein in this case the friction welding device 132 is closed. The strip-shaped tying material 40, which is located in a tying cycle in this position of the friction welding device 132 between precisely this friction welding device 132 and the pivot element 88, is not illustrated.

This pivot movement of the friction welding device 132 is also triggered by a lever which is arranged on a lever shaft whose movement, in turn, is guided by a cam disk (compare FIG. 15). The welding element 126 as well as the weld clamping device 128 are mechanically guided thereby. In order to avoid an overload of these components during clamping or welding, overload protection devices in the form of spring packs are provided. An overload protection device is arranged between lever shaft and friction welding device 132. Additional own overload protection devices are correlated with the welding element 126 and the weld clamping device 128, respectively. In addition to the overload protection action, they serve also for fine adjustment of the contact pressure of the welding element 126 and of the clamping force of the weld clamping device 128 which can thus be realized independent of each other.

FIGS. 18 to 21 show the forward clamping device 94. Moreover, illustrated are the counter holder 86, the hold-down device 118, a clamping arm 104, and a cutting arm 112. According to the description of a tying cycle (compare FIG. 13), the forward clamping device 94 clamps the strip-shaped tying material 40 in the initial position of the tying device.

Figure 19:
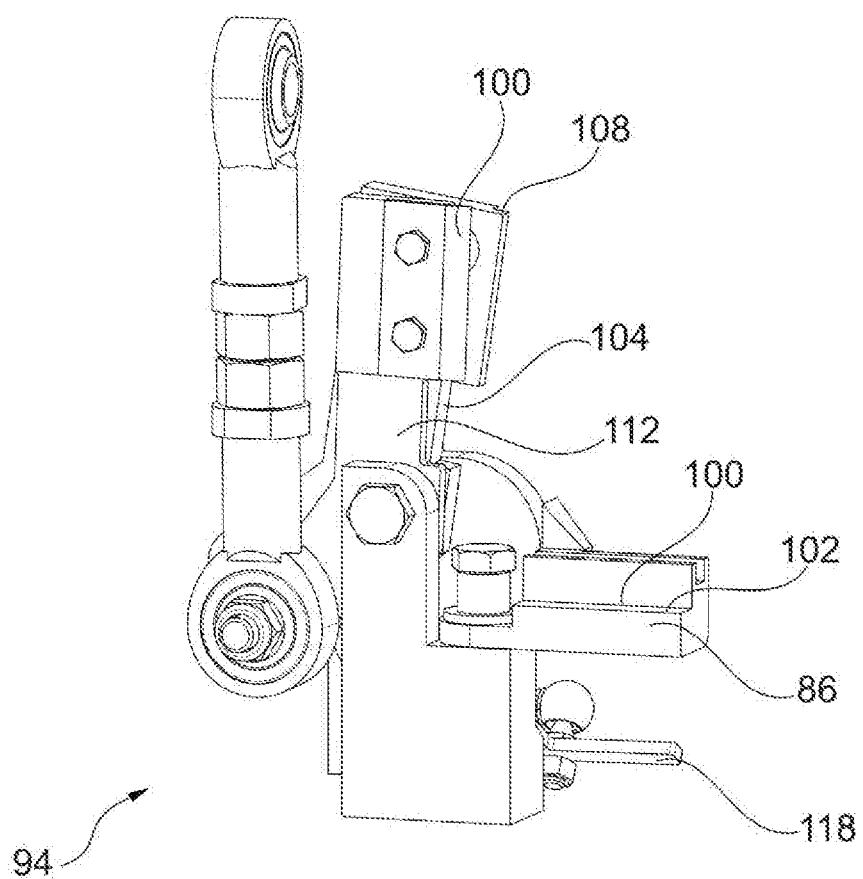
FIG. 19 an overview illustration of the open forward clamping device according to FIG. 18.

The counter holder 86 is pivotably supported about a counter holder pivot axis 46 above the tying table. FIG. 19 shows the counter holder 86, which comprises in the upper area a counter blade 102 and a projection 108 belonging to a fixation arrangement 106, in a counter holding position. The forward clamping device 94 with its clamping arm 104 and the cutting device 100 with its cutting arm 112 are open. The hold-down device 118, that is pivotable about a hold-down pivot axis 120 in an attachment point 122 relative to the tying table, is folded outward.

Figure 20:
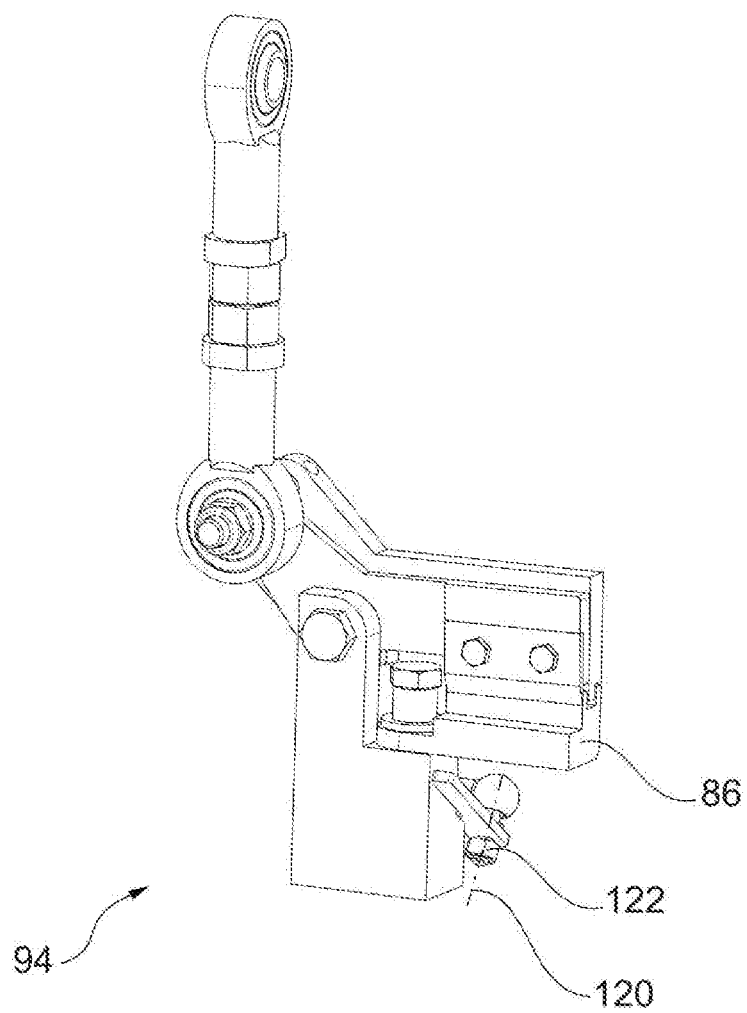
FIG. 20 an overview illustration of the closed forward clamping device according to FIG. 18.

FIG. 20 shows the counter holder 86 again in the counter holding position and the forward clamping device 94 in a clamping position. In this clamping position, it clamps the strip-shaped tying material 40 while the tying device is in the initial position. In this context, a projection 108 of the clamping arm 104 engages a cutout and the cutting arm 112, which is trailing upon closing of the forward clamping device 94, cuts the strip-shaped tying material 40, with existing clamping action, by interaction of the blade arranged at the cutting arm 112 with a counter blade 102. The hold-down device 118 is folded in upon closing of the forward clamping device 94 and the cutting device 100.

Figure 21:
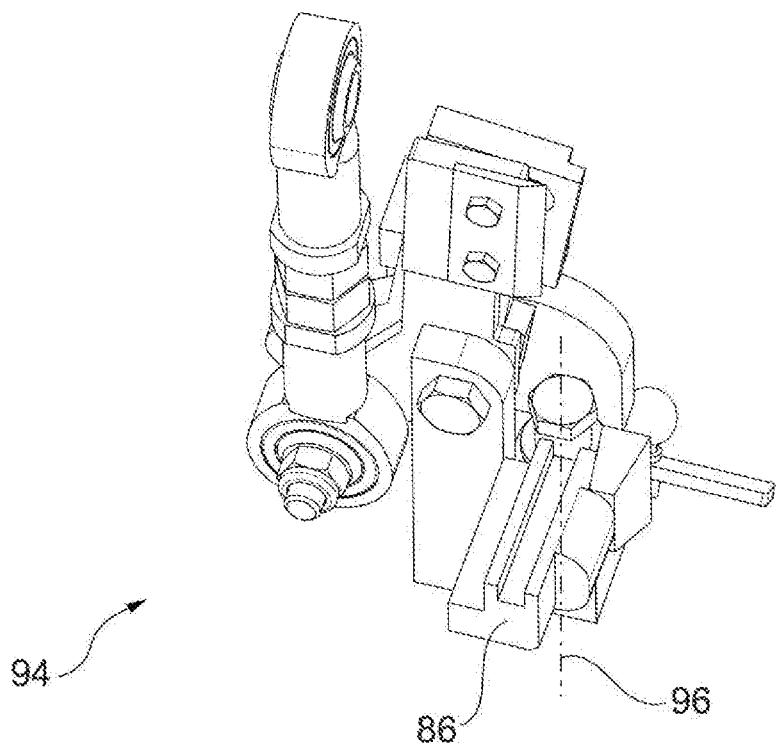
FIG. 21 an overview illustration of the forward clamping device according to FIG. 18 with an evading counter holder.

FIG. 21 shows the counter holder 86 in an evading position in which it evades the loop of the strip-shaped tying material 40 supplied through the tying needle 14. A spring element, not illustrated, returns the counter holder 86 into the counter position, when no force action is acting through the strip-shaped tying material 40.

At the forward clamping device 94, a lever is arranged which, in turn, is arranged at a lever shaft whose pivot movement is guided by a cam disk.

Figure 22:
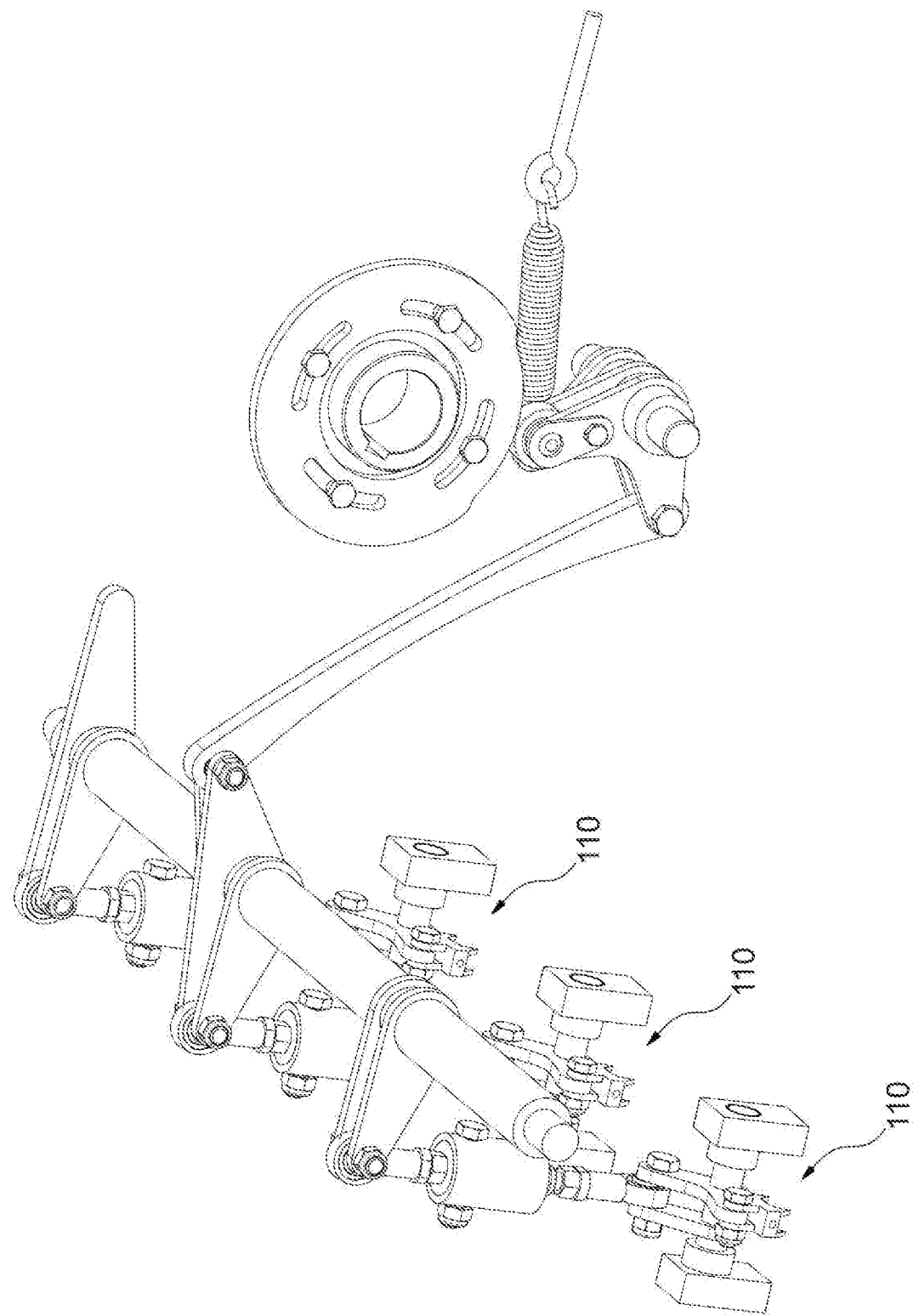
FIG. 22 an overview illustration of an embodiment of a rearward clamping device inclusive of a second clamping device drive.
Figure 23:
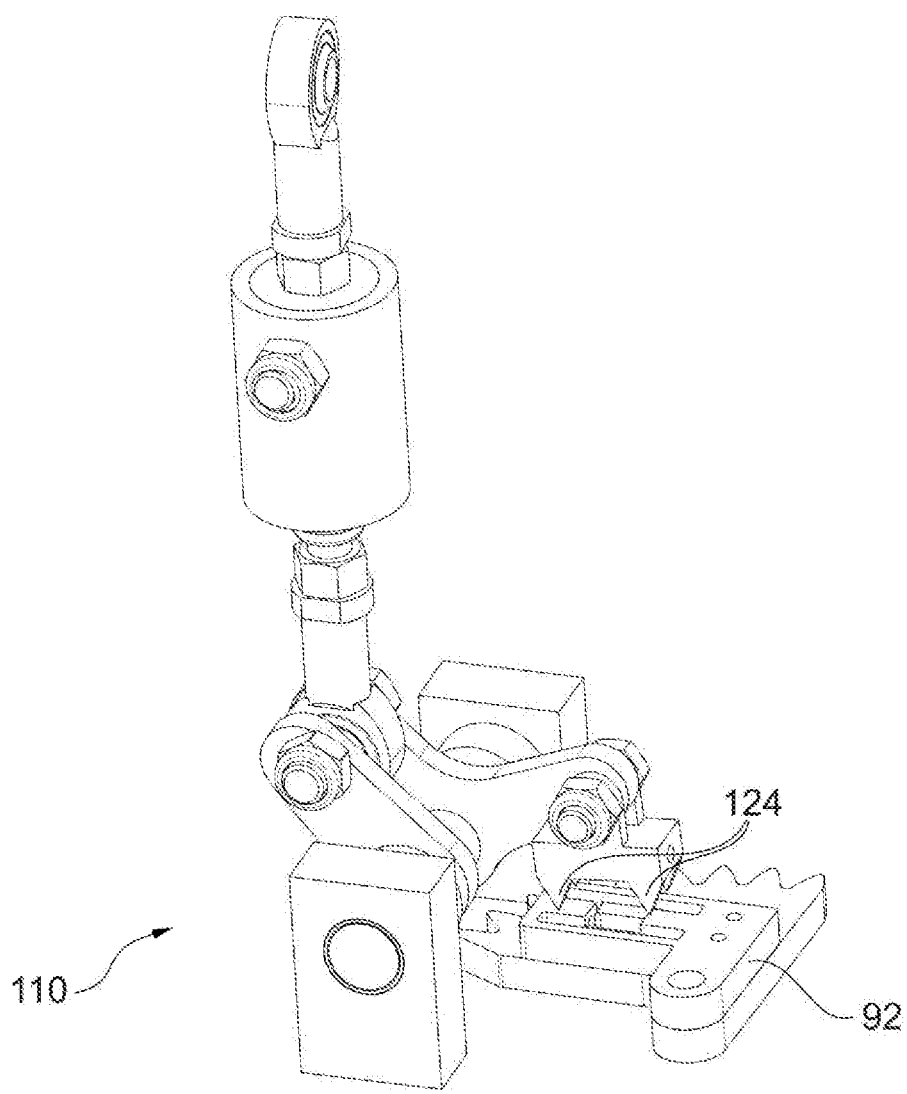
FIG. 23 an overview illustration of the rearward clamping device according to FIG. 22 with a counter pivot element.

FIG. 22 and FIG. 23 show the rearward clamping device 110. It is located in the travel direction of the baler 2 behind the friction welding device 132 and fixedly clamps the strip-shaped tying material 40 in a clamping position on the counter pivot element 92. For ensuring an optimal orientation of the strip-shaped tying material 40 relative to the welding element 126 the rearward clamping device 110 is provided with catching teeth 124. These catching teeth 124 engage in the clamping position around the strip-shaped tying material 40 and center it. For this purpose, the counter pivot element 92 illustrated in FIG. 23 comprises cutouts which are opposite the catching teeth 124.

The rearward clamping device 110 is also controlled by a lever, a lever shaft, and a cam disk which is arranged on the control shaft 38. Here, an overload protection device in the form of a spring pack is provided also between lever shaft and rearward clamping device 110. The overload protection device is also utilizable for fine adjustment of the clamping force of the rearward clamping device 110.

Figure 24A:
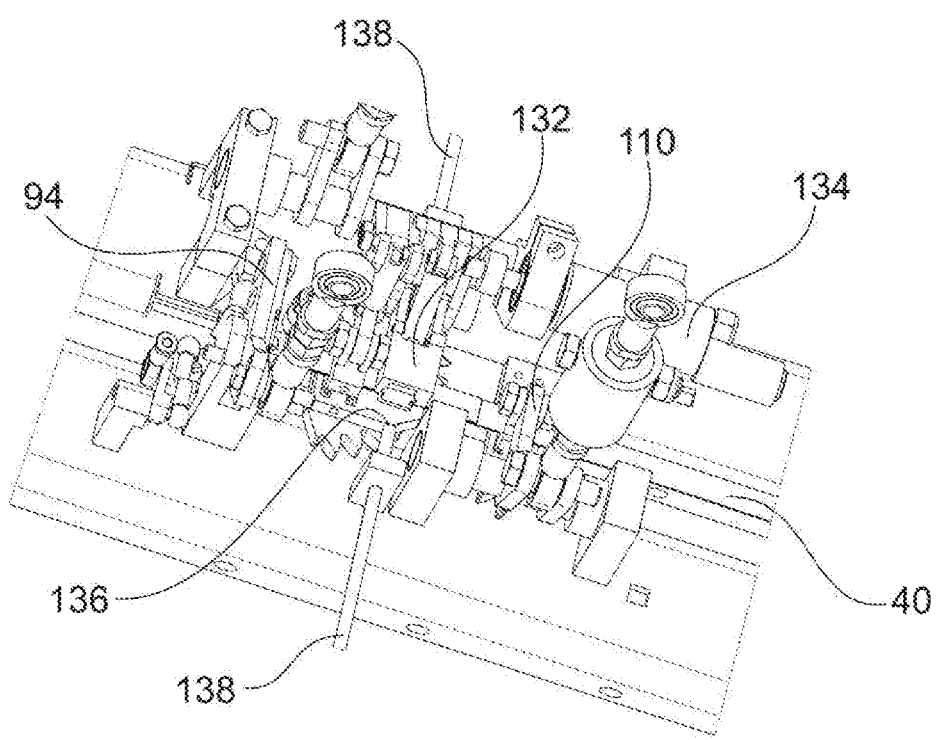
FIG. 24a an overview illustration of an embodiment of a cooling device.

FIG. 24a shows the forward clamping device 94, the rearward clamping device 110 as well as the friction welding device 132 on the tying table. In addition, two supply elements 138 are illustrated which are part of the air cooling device. At its end which is facing the strip-shaped tying material 40, a nozzle 136 is provided, respectively. Through supply element 138 and nozzle 136, an air stream reaches the sections of the strip-shaped tying material 40 positioned underneath the welding element 126 so that cooling of the weld location is accelerated thereby.

Figure 24B:
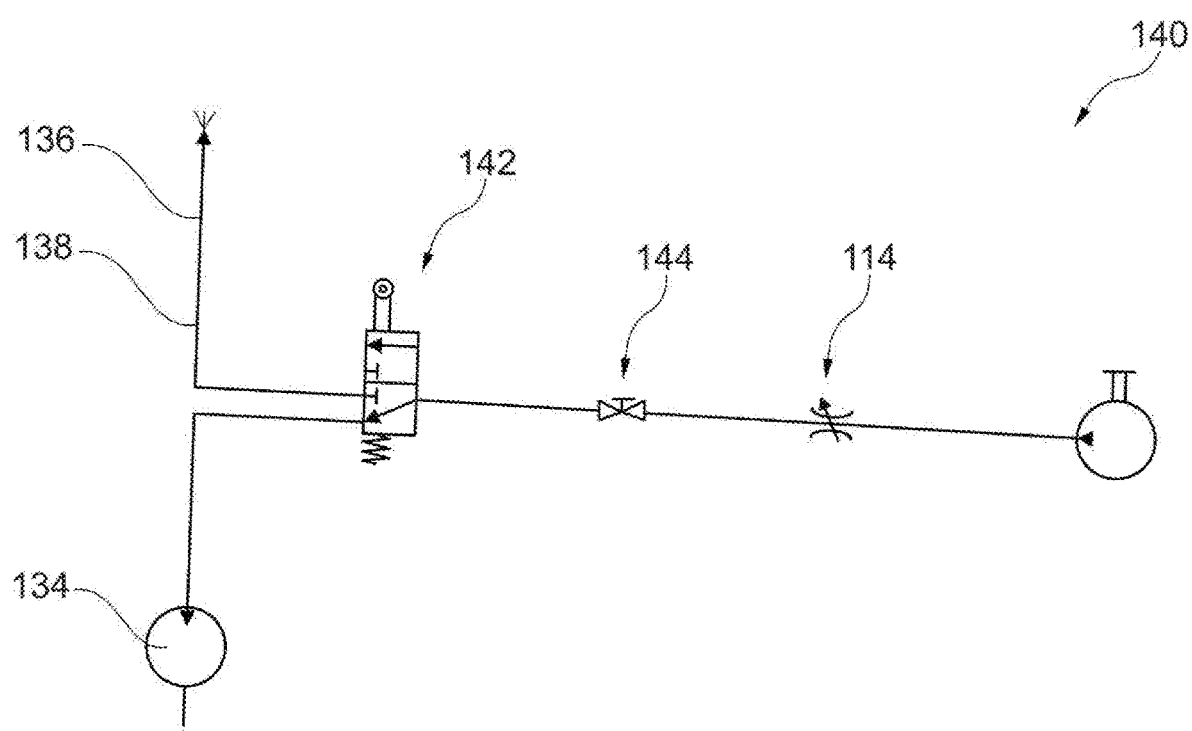
FIG. 24b a schematic circuit diagram of the cooling device.

FIG. 24b shows a circuit diagram of the cooling device. The control device 140 which is illustrated thereby symbolically comprises a compressed air valve 144 and a switch valve 142. The switch valve 142 can supply a compressed air stream to the compressed air motor 134 and to the nozzle 136 through the supply element 138 after termination of welding.

FIG. 25 shows three strip guiding elements 146 which are each assigned to a tying device. The strip guiding elements 146 are adjustably arranged on a guide carrier element 150. The strip guiding elements 146 each comprise two guide projections 148 which when contacting the strip-shaped tying material 40 ensure centering thereof. By means of the strip guiding elements 146 the orientation of the lower one of the two layers to be fused of the strip-shaped tying material 40 is ensured. FIG. 8 shows that the guide carrier element 150 is arranged for this purpose behind the rearward clamping device 110 on the tying table.

LIST OF REFERENCE CHARACTERS 2 baler
4 pressing channel
8 rocker pivot axis
10 drive arrangement
12 needle rocker
14 tying needle
16 drive axis of rotation
18 drive element
20 drive lever
22 coupling device
24 coupling pivot axis
26 first coupling lever
28 further coupling lever
30 drive lever axis of rotation
32 drive coupling pivot axis
34 pressing piston
36 guide roller
38 control shaft
40 strip-shaped tying material
42 material fusion generator
44 brake contact surface
46 decoiling device
48 control device
50 control element
52 brake element
54 brake restoring element
56 strip roll
58 strip roll carrier
60 longitudinal center axis of the pressing channel
62 decoiling axis of rotation
64 control element pivot axis
66 guide element
68 brake element surface
70 transmission device
72 control lever
74 deflection element
76 strip storage device
78 strip storage axle body
80 free axle body
82 strip storage restoring element
86 counter holder
88 pivot element
90 pivot element control lever
92 counter pivot element
94 forward clamping device
96 counter holder pivot axis
98 partial toothed ring
100 cutting device
102 counter blade 104 clamping arm
106 fixation arrangement
108 projection
110 rearward clamping device
112 cutting arm
114 throttle
118 hold-down device
120 hold-down pivot axis
122 attachment point
124 catching teeth
126 welding element
128 weld clamping device
130 welding device pivot axis
132 friction welding device
134 compressed air motor
136 nozzle
138 supply element
140 control device
142 switching valve
144 compressed air valve
146 strip guiding element
148 guide projection
150 guide carrier element

What is claimed is:

1. A baler for agricultural crop, the baler comprising:
a pressing channel comprising a longitudinal center axis;
a needle rocker pivotably arranged at the pressing channel about a rocker pivot axis arranged in a rocker pivot axis plane that is orthogonal to the longitudinal center axis of the pressing channel;
one or more drive arrangements operatively connected to the needle rocker and configured to pivot the needle rocker relative to the pressing channel;
the needle rocker comprising one or more tying needles that are moved through the pressing channel when the needle rocker is pivoted;
the one or more drive arrangements comprising:
a drive element, rotatably supported about a drive axis of rotation;
a coupling device consisting of a first coupling lever and a second coupling lever, wherein the first coupling lever and the second coupling lever are connected pivotably to each other about a first coupling pivot axis, wherein the first coupling lever is pivotably supported about a second coupling pivot axis so as to pivot about the second coupling pivot axis, wherein the second coupling pivot axis is positioned stationarily relative to the pressing channel;
a drive lever comprising a first end eccentrically connected to the drive element, wherein the first end of the drive lever is rotatably connected to the drive element so as to be rotatable relative to the drive element about a drive lever axis of rotation passing through the drive element, wherein the drive lever further comprises a second end rotatably connected to the first coupling lever about a drive coupling pivot axis, wherein the drive coupling pivot axis is positioned at a distance from the first coupling pivot axis and at a distance from the second coupling pivot axis,
wherein the second coupling lever is connected to the needle rocker at a distance from the rocker pivot axis of the needle rocker;
wherein the rocker pivot axis, the drive axis of rotation of the drive element, the drive lever axis of rotation passing through the drive element, and the coupling pivot axis are arranged parallel to each other and are spaced apart from each other, respectively.

2. The baler according to claim 1, wherein the one or more drive arrangements are arranged on one side of the pressing channel.

3. The baler according to claim 1, wherein the one or more drive arrangements include a first drive arrangement and a second drive arrangement, wherein the first drive arrangement is arranged at a first side of the pressing channel and the second drive arrangement is arranged at a second side of the pressing channel, wherein the second side is opposite the first side.

4. The baler according to claim 1, wherein pivot axes of all joints of the coupling device are positioned parallel to the rocker pivot axis.

5. The baler according to claim 1, wherein:
the needle rocker comprises an initial position in which the needle rocker is positioned before and after a needle rocker cycle terminating a bale tying action;
in the initial position, the drive lever axis of rotation of the first end of the drive lever is displaced relative to a coupling plane in which the drive axis of rotation and the drive coupling pivot axis of the second end of the drive lever are positioned.

6. The baler according to claim 5, wherein the drive axis of rotation and the drive lever axis of rotation of the first end of the drive lever are positioned in a drive plane which is positioned in the initial position at a slant of 30° to 90° relative to the coupling plane.

7. The baler according to claim 5, wherein the second coupling lever is pivotably connected to the needle rocker about a third coupling pivot axis so as to pivot about the third coupling pivot axis, wherein the second coupling pivot axis and the third coupling pivot axis have a maximal possible distance from each other in the initial position of the needle rocker in which the first and the second coupling levers are in a straight stretched position relative to each other and the first, second, and third coupling pivot axes are arranged in a common plane.

8. The baler according to claim 1, wherein, for a maximal pivoting of the needle rocker, a pressing piston arranged in the pressing channel is positioned in a stretched position.

9. The baler according to claim 1, wherein the needle rocker comprises at least three of the tying needles and the at least three tying needles each are extending in a plane that is perpendicular relative to the rocker pivot axis.

10. The baler according to claim 1, wherein the one or more tying needles comprise at least one guide roller guiding a strip-shaped tying material.

11. The baler according to claim 1, wherein the drive element is arranged at a control shaft, wherein the control shaft controls a bale tying cycle of the baler with one revolution of the control shaft.

12. The baler according to claim 1, further comprising at least one tying device comprising a material fusion generator that joins a strip-shaped tying material, looped around a bale in the pressing channel, by material fusion.

13. The baler according to claim 12, wherein the strip-shaped tying material is a fusible plastic material or a glueable plastic material.

14. The baler according to claim 12, wherein the at least one tying device comprises a decoiling device and a strip storage device configured to store a part of the strip-shaped tying material guided from the decoiling device to the material fusion generator, wherein the strip storage device comprises at least two strip storage axle bodies and wherein the strip-shaped tying material is looped around the at least two strip storage axle bodies, wherein the at least two strip storage axle bodies include a free axle body that is arranged movably such that a distance of the at least two strip storage axle bodies relative to each other is changeable, and wherein the strip storage device comprises at least one strip storage restoring element configured to load the free axle body by a force in a direction enlarging the distance of the at least two strip storage axle bodies.

* * * * *